(12) United States Patent
Kamikubo et al.

(10) Patent No.: US 10,482,018 B2
(45) Date of Patent: Nov. 19, 2019

(54) ARITHMETIC PROCESSING UNIT AND METHOD FOR CONTROLLING ARITHMETIC PROCESSING UNIT

(71) Applicant: FUJITSU LIMITED, Kawasaki-shi, Kanagawa (JP)

(72) Inventors: Yuki Kamikubo, Yokohama (JP); Noriko Takagi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/110,578

(22) Filed: Aug. 23, 2018

(65) Prior Publication Data

US 2019/0079870 A1 Mar. 14, 2019

(30) Foreign Application Priority Data

Sep. 13, 2017 (JP) ................................ 2017-175642

(51) Int. Cl.
| G06F 12/00 | (2006.01) |
| G06F 12/0855 | (2016.01) |
| G06F 12/0811 | (2016.01) |

(52) U.S. Cl.
CPC ...... *G06F 12/0855* (2013.01); *G06F 12/0811* (2013.01); *G06F 2212/1032* (2013.01)

(58) Field of Classification Search
None
See application file for complete search history.

(56) References Cited

U.S. PATENT DOCUMENTS

| 6,694,408 B1 * | 2/2004 | Villagomez ........... G06F 12/121 711/128 |
| 7,107,367 B1 | 9/2006 | Hughes |
| 2006/0026361 A1 | 2/2006 | Shimizuno et al. |
| 2008/0301372 A1 | 12/2008 | Kojima et al. |

(Continued)

FOREIGN PATENT DOCUMENTS

| JP | 8-328960 | 12/1996 |
| JP | 9-218823 | 8/1997 |

(Continued)

OTHER PUBLICATIONS

Office Action for related U.S. Appl. No. 15/683,838 dated Oct. 5, 2018.

(Continued)

*Primary Examiner* — John A Lane
(74) *Attorney, Agent, or Firm* — Staas & Halsey LLP

(57) ABSTRACT

An arithmetic processing unit includes a cache including a cache memory for storing states of data and data in a block at an index of the memory access request, a move-in buffer control unit that issues a move-in request when cache miss, and move-in buffers for registering the move-in request. The move-in buffer control unit, in response to cache miss, (a) secures a vacant move-in buffer when the vacant move-in buffer exists, (b) issues a move-in request when a move-in request having a same index as the memory access request is not registered in the move-in buffers, (c) issues the move-in request when the move-in request having the same index is registered in the move-in buffers and all ways are not used by the move-in request having the same index in the move-in buffers, and (d) releases the secured move-in buffer when all the ways are used.

8 Claims, 14 Drawing Sheets

(56) References Cited

U.S. PATENT DOCUMENTS

| | | |
|---|---|---|
| 2010/0088550 A1 | 4/2010 | Imai et al. |
| 2014/0019690 A1 | 1/2014 | Hikichi et al. |
| 2018/0095886 A1 | 4/2018 | Kamikubo et al. |

FOREIGN PATENT DOCUMENTS

| | | |
|---|---|---|
| JP | 2001-51899 | 2/2001 |
| JP | 2006-39937 | 2/2006 |
| JP | 2018-55568 | 4/2018 |
| WO | 2007/088591 A1 | 8/2007 |

OTHER PUBLICATIONS

Office Action for related U.S. Appl. No. 15/683,838 dated Mar. 21, 2019.

\* cited by examiner

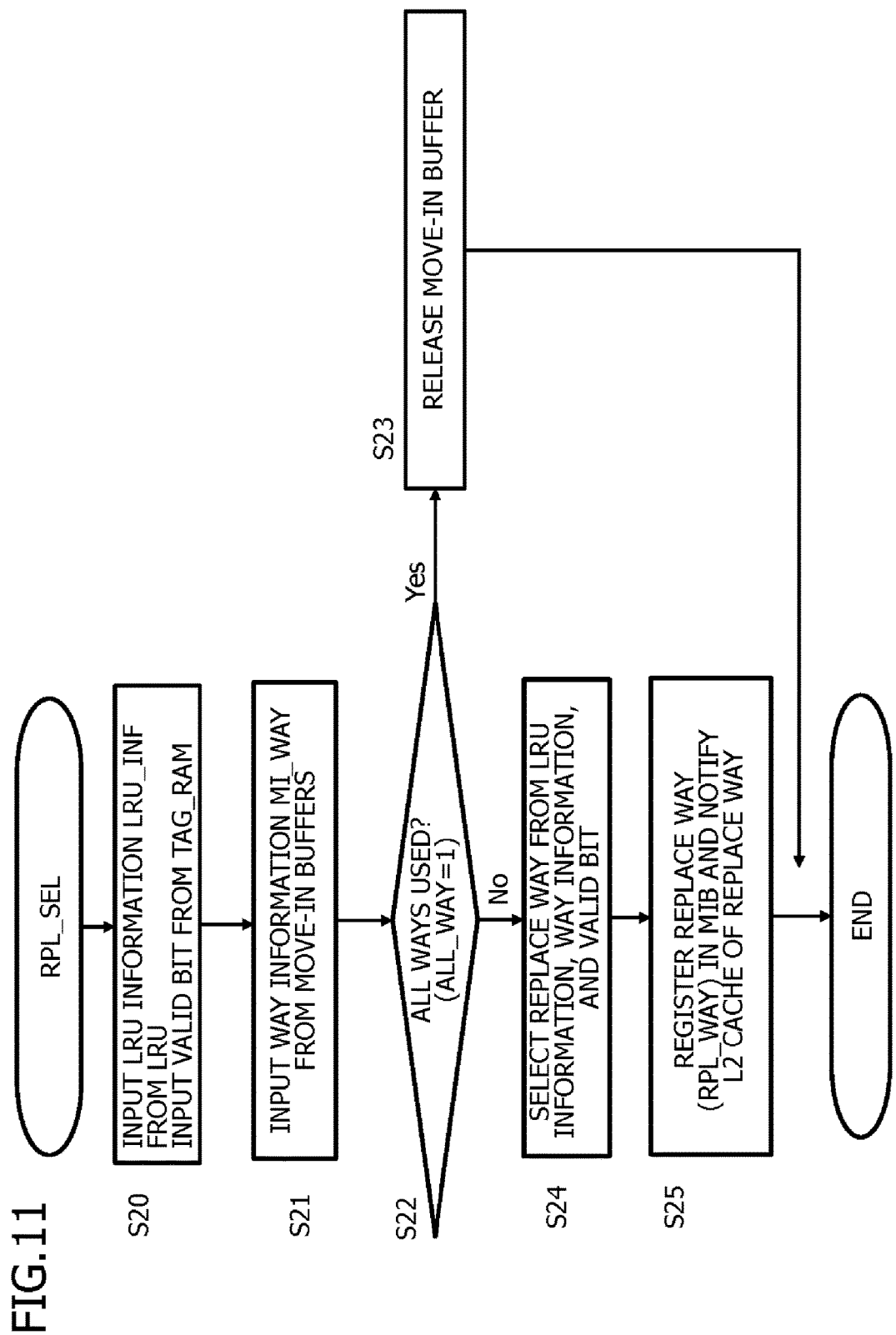

FIG.12

(CASE 1): INVALID WAY EXISTS IN L1 CACHE
AND MI_RQ IN MOVE-IN BUFFER HAS NOT USE WAY

| pattern | invalid_WAY*MI_RQ DOES NOT USE | | | | Rpl-WAY |
|---|---|---|---|---|---|
| | W0 | W1 | W2 | W3 | |
| 1-1 | 1 | - | - | - | W0 |
| 1-2 | 0 | 1 | - | - | W1 |
| 1-3 | 0 | 0 | 1 | - | W2 |
| 1-4 | 0 | 0 | 0 | 1 | W3 |

(CASE 2): OTHER THAN CASE 1
(NO INVALID WAY EXISTS IN L1 CACHE)

| pattern | WAY NOT BEING USED BY MI_RQ IN MIB (1 = USING) | | | | LRU TRUTH TABLE |
|---|---|---|---|---|---|
| | W0 | W1 | W2 | W3 | |
| 2-1 | 0 | 0 | 0 | 0 | [1] |
| 2-2 | 1 | 0 | 0 | 0 | [2] |
| 2-3 | 0 | 1 | 0 | 0 | [3] |
| 2-4 | 0 | 0 | 1 | 0 | [4] |
| 2-5 | 0 | 0 | 0 | 1 | [5] |
| 2-6 | 1 | 1 | 0 | 0 | [6] |
| 2-7 | 1 | 0 | 1 | 0 | [7] |
| 2-8 | 1 | 0 | 0 | 1 | [8] |
| 2-9 | 0 | 1 | 1 | 0 | [9] |
| 2-10 | 0 | 1 | 0 | 1 | [10] |
| 2-11 | 0 | 0 | 1 | 1 | [11] |
| 2-12 | 1 | 1 | 1 | 0 | W3 |
| 2-13 | 1 | 1 | 0 | 1 | W2 |
| 2-14 | 1 | 0 | 1 | 1 | W1 |
| 2-15 | 0 | 1 | 1 | 1 | W0 |
| 2-16 | 1 | 1 | 1 | 1 | ALL_WAY=1 |

LRU TRUTH TABLE

[1]
| pattern | LRU INFORMATION | Rpl-WAY |
|---|---|---|
| L-1 | LRU=WAY0 | W0 |
| L-2 | LRU=WAY1 | W1 |
| L-3 | LRU=WAY2 | W2 |
| L-4 | LRU=WAY3 | W3 |

[2]
| pattern | LRU INFORMATION | Rpl-WAY |
|---|---|---|
| L-5 | LRU=WAY1 | W1 |
| L-6 | LRU=WAY2 | W2 |
| L-7 | LRU=WAY3 | W3 |

[3]
| pattern | LRU INFORMATION | Rpl-WAY |
|---|---|---|
| L-8 | LRU=WAY0 | W0 |
| L-9 | LRU=WAY2 | W2 |
| L-10 | LRU=WAY3 | W3 |

[4]
| pattern | LRU INFORMATION | Rpl-WAY |
|---|---|---|
| L-11 | LRU=WAY0 | W0 |
| L-12 | LRU=WAY1 | W1 |
| L-13 | LRU=WAY3 | W3 |

[5]
| pattern | LRU INFORMATION | Rpl-WAY |
|---|---|---|
| L-14 | LRU=WAY0 | W0 |
| L-15 | LRU=WAY1 | W1 |
| L-16 | LRU=WAY2 | W2 |

[6]
| pattern | LRU INFORMATION | Rpl-WAY |
|---|---|---|
| L-17 | LRU=WAY2 | W2 |
| L-18 | LRU=WAY3 | W3 |

[7]
| pattern | LRU INFORMATION | Rpl-WAY |
|---|---|---|
| L-19 | LRU=WAY1 | W1 |
| L-20 | LRU=WAY3 | W3 |

[8]
| pattern | LRU INFORMATION | Rpl-WAY |
|---|---|---|
| L-21 | LRU=WAY1 | W1 |
| L-22 | LRU=WAY2 | W2 |

[9]
| pattern | LRU INFORMATION | Rpl-WAY |
|---|---|---|
| L-23 | LRU=WAY0 | W0 |
| L-24 | LRU=WAY3 | W3 |

[10]
| pattern | LRU INFORMATION | Rpl-WAY |
|---|---|---|
| L-25 | LRU=WAY0 | W0 |
| L-26 | LRU=WAY2 | W2 |

[11]
| pattern | LRU INFORMATION | Rpl-WAY |
|---|---|---|
| L-27 | LRU=WAY0 | W0 |
| L-28 | LRU=WAY1 | W1 |

※Rpl-way : REPLACE WAY
※W0 : WAY NUMBER=0
※W1 : WAY NUMBER=1
※W2 : WAY NUMBER=2
※W3 : WAY NUMBER=3

FIG.14

| Cycle | 0 | 1 | 2 | 3 | 4 | 5 | 6 | 7 | 8 | PRESENCE OR ABSENCE OF STAY |
|---|---|---|---|---|---|---|---|---|---|---|
| INSTRUCTION1 | B | B1 | B2 | B3 | B4 | | | | | |
| INSTRUCTION2 | | B | B1 | B2 | B3 | B4 | | | | STAY |
| INSTRUCTION3 | | | B | B1 | B2 | B3 | B4 | | | |
| INSTRUCTION4 | | | | B | B1 | B2 | B3 | B4 | | STAY |
| INSTRUCTION5 | | | | | B | B1 | B2 | B3 | B4 | |

ABSTRACT

ARITHMETIC PROCESSING UNIT AND METHOD FOR CONTROLLING ARITHMETIC PROCESSING UNIT

CROSS-REFERENCE TO RELATED APPLICATION

This application is based upon and claims the benefit of priority of the prior Japanese Patent Application No. 2017-175642, filed on Sep. 13, 2017, the entire contents of which are incorporated herein by reference.

FIELD

The present invention relates to a arithmetic processing unit and a method for controlling a arithmetic processing unit.

BACKGROUND

A arithmetic processing unit (processor, central processing unit (CPU)) has a cache memory to avoid a long latency for accessing a main storage unit (main memory) provided outside. The cache memory stores data read out from the main memory when the processor executes a memory access instruction. Then, when executing the memory access instruction again for the same address, the processor reads out the data from the cache memory (that may be hereinafter called a "cache") to avoid accessing the main memory.

When the instruction issuance unit of the processor issues a load instruction or a storage instruction, a memory access request is input to a cache. Then, the cache makes a cache determination as to whether the data of the access address has been retained or registered in the cache memory. When a cache hit has occurred, the cache returns the data response of data in the cache memory (returns the response with the data) to the instruction issuance unit. On the other hand, when determining that a cache miss has occurred, the cache issues a move-in request to a low-level cache closer to the main memory or a memory control circuit.

The move-in request is a request in which a certain-level cache requests a low-level cache closer to the main memory or the memory control unit to return the data of the access address, i.e., a type of the memory access request. The move-in request is issued by a cache in which a cache miss has occurred.

The move-in request is disclosed in International Publication Pamphlet No. WO2007/088591 and Japanese Laid-open Patent Publication No. 2001-51899.

Since it may take a long time from the issuance of a move-in request to a data response thereto, a move-in buffer for registering therein information indicating that the move-in request has been issued is provided, for example, between an L1 cache and an L2 cache (or between the L2 cache and an L3 cache). When issuing the move-in request, the L1 cache acquires the move-in buffer and registers, in the move-in buffer, the index information of the move-in request, i.e., the index information (index address) of a cache memory in which a cache miss has occurred and the way information of the cache in which response data is to be registered after a data response.

After the L2 cache issues an ejection request for ejecting old data having been registered in the L1 cache and the data is ejected from the L1 cache to the L2 cache, the L1 cache receives a data response from the L2 cache and stores new data in the data region of a corresponding move-in buffer. Then, the L1 cache registers the returned data in an L1 cache memory based on the index information and the way information that have been registered in the move-in buffer, and returns a data response to the instruction issuance unit (or an upper level cache more distant from the main memory). After receiving the data response, the move-in buffer that has registered the information of the move-in request is released. By registering a plurality of move-in request information in the move-in buffer, the L1 cache issues the next move-in request before receiving a data response for a preceding move-in request.

SUMMARY

The cache preferably prevents a plurality of move-in requests having the same index and the same replace way from being issued at the same time. This is because, for example, a request for ejecting data inside a replace way and a data response for the following move-in request are likely to overtake a data response for a preceding move-in request. When the overtake is happened, the response data of the preceding move-in request is registered in the cache after the ejection of the data and the cache registration of the data response for the following move-in request, with respect to the same cache block (cache block of the same index and the same way). In such an operation, cache coherency is not able to be maintained between the L1 cache and the L2 cache, and a protocol error occurs in the caches.

On the other hand, in order to prevent the issuance of a move-in request competing in the above same cache block (having the same index address and the same way), it is preferable to check a move-in buffer when a cache miss occurs to determine whether there is a move-in request running or registered in the move-in buffer that has the same index and the same way as those of the memory access request to which a cache miss has occurred.

However, since a predetermined processing cycle is necessary for the determination, a pipeline circuit inside a move-in buffer control unit that operates at a high-frequency clock has a difficulty in efficiently processing successive memory access requests to which a cache miss has occurred in a short clock cycle.

Therefore, some processors omit a determination as to whether the same replace way exists, prevents the issuance of a move-in request for a memory access request when a move-in request having the same index as that of the memory access request to which a cache miss has occurred has been registered in move-in buffers, aborts the memory access request and returns the same to a request port. Such processors increase the processing efficiency of a move-in buffer control unit for successive memory access requests, but cause a reduction in performance, since the processors are not able to issue a plurality of move-in requests with competing index until the number of ways being replaceable.

According to an aspect of the first embodiment, an arithmetic processing unit including: a memory access request issuance unit configured to issue a memory access request; and a cache including a cache memory including a tag memory and a data memory, states of data and data being registered in a block at an index that matches with matching an index of the memory access request inside the tag memory and the data memory, a move-in buffer control unit that issues a move-in request to register data of the memory access request in the cache when the memory access request causes a cache miss,
a plurality of move-in buffers each of which registers information of the move-in request, wherein,
the move-in buffer control unit, in response to an input of the memory access request to which the cache miss occurs,
(a) secures a vacant move-in buffer for the memory access request when judging that the vacant move-in buffer exists in the plurality of move-in buffers,
(b) issues a move-in request of the memory access request having secured the move-in buffer when judging that a move-in request having a same index as an index of the memory access request has not been registered in any of the plurality of move-in buffers,
(c) issues the move-in request of the memory access request having secured the move-in buffer when judging that the move-in request having the same index has been registered in any of the plurality of move-in buffers and further judging that all ways serving as replace ways have not been used by the move-in request having the same index that has been registered in any of the plurality of move-in buffers, and
(d) releases the secured move-in buffer and prevents an issuance of the move-in request when judging that all the ways have been used.

According to a first aspect, it is possible to improve the move-in request issuance performance in a cache.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a flowchart diagram illustrating the operation of the replace way selection unit.

FIG. 12 is a diagram illustrating the truth tables of the replace way selection circuit.

FIG. 14 is a diagram for describing the processing of successive instructions.

DESCRIPTION OF EMBODIMENTS

Arithmetic Processing Unit (Processor)

Figure 1:
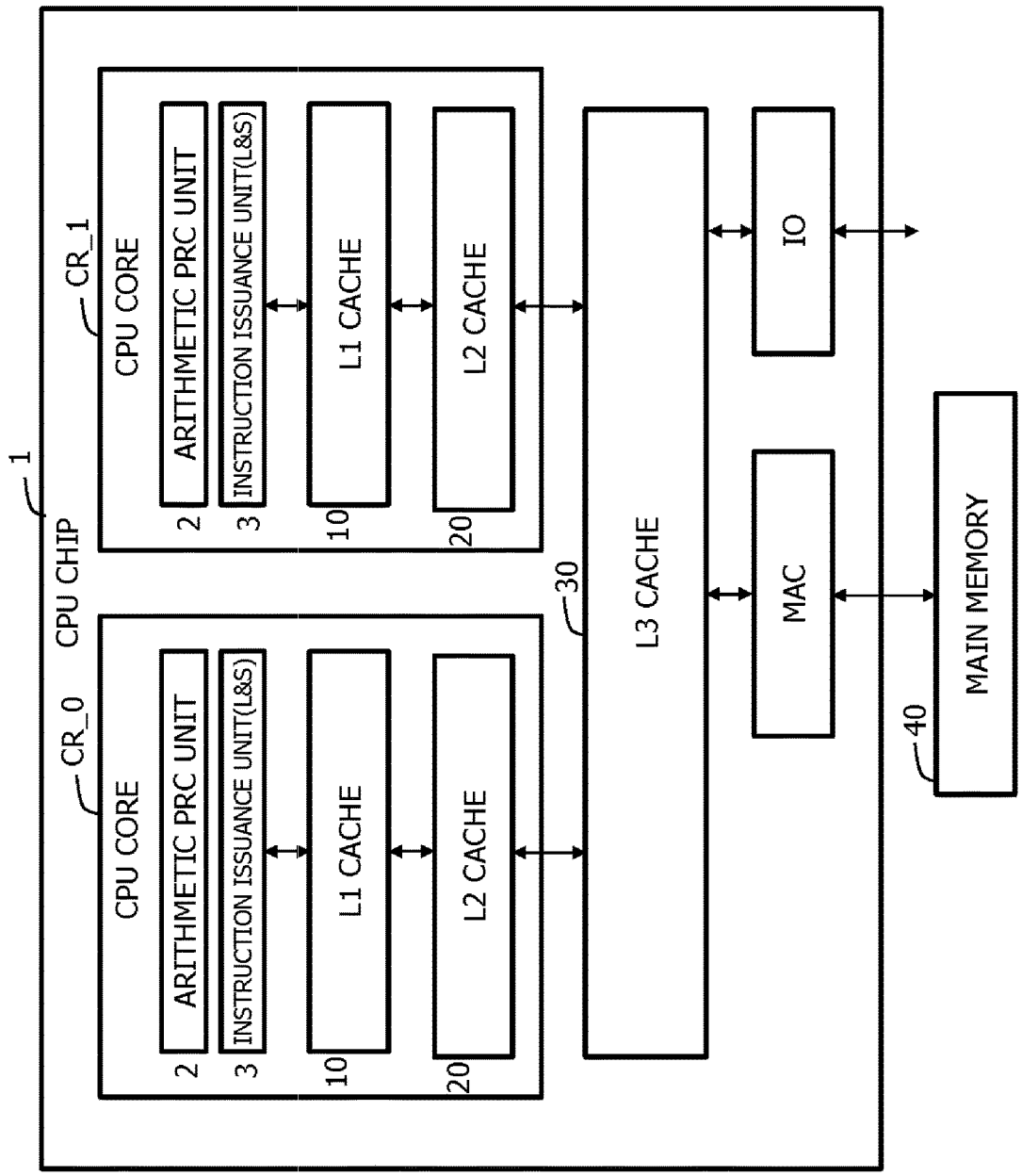
FIG. 1 is a diagram illustrating the configuration of a arithmetic processing unit (processor) according to an embodiment.

FIG. 1 is a diagram illustrating the configuration of an arithmetic processing unit (processor) according to an embodiment. A processor 1 is, for example, a CPU chip in which processor circuits are integrated, and is capable of accessing a main storage device (main memory) 40 such as a DRAM. The processor 1 and the main memory 40 constitute an information processing apparatus such as a computer.

The processor 1 has, for example, a plurality of CPU cores CR_0 and CR_1. The respective CPU cores has, for example, an arithmetic and logical processing unit 2, a instruction issuance unit 3 that processes a load instruction or a storage instruction, a first-level cache (L1 cache) 10, and a second-level cache (L2 cache) 20. In addition, the processor 1 has a third-level cache (L3 cache) 30 shared among the L2 caches 20 of the plurality of CPU cores, a memory access controller MAC that controls access to the main memory 40, and an input/output circuit IO that performs an input/output operation to a hard disk or the like provided outside the CPU chip.

As a cache having move-in buffers according to the embodiment, any of the L1 cache 10, the L2 cache 20, and the L3 cache 30 may be, for example, used. However, the following embodiment will describe an example where the cache having move-in buffers is applied to the L1 cache.

When the instruction issuance unit 3 issues a load instruction or a storage instruction in any of the CPU cores, a memory access request corresponding to the load instruction or the storage instruction is issued and input to the L1 cache 10. Accordingly, the instruction issuance unit 3 serves also as a request issuance unit that issues the memory access request. The following embodiment will describe an example in which the memory access request is a load instruction (a instruction for reading data from the main memory).

The L1 cache 10 checks a tag memory based on the access address of the memory access request to determine the cache hit. When a cache hit occurs in the L1 cache 10, the L1 cache 10 returns data inside the L1 cache 10 to the instruction issuance unit 3. On the other hand, when a cache miss occurs in the L1 cache 10, the L1 cache 10 issues a move-in request to the L2 cache 20. The move-in request is a request for requesting the registration of the data of the memory access request in the L1 cache memory. Then, when receiving a data response from the L2 cache, the L1 cache 10 registers the data in the cache and returns the data to the instruction issuance unit 3.

When a cache miss occurs in the L2 cache 20 to the move-in request (a kind of the memory access request) issued by the L1 cache 10, the L2 cache 20 issues a move-in request to the L3 cache in the same manner as the above. Similarly, when a cache miss occurs in the L3 cache 30 about the move-in request from the L2 cache, the L3 cache issues an access request equivalent to a move-in request to the memory access controller MAC. That is, when a cache miss occurs in a certain-level cache to a received memory access request, the cache issues a move-in request to a cache at a level closer to the main memory or the memory controller.

The respective caches have a plurality of move-in buffers (not illustrated) that registers the information of move-in requests between the cache themselves and caches on the side of the main memory or between the cache themselves and the memory access controller. Since the caches have the plurality of move-in buffers respectively, the caches are allowed to register the information of a plurality of move-in requests therein and issue a plurality of move-in requests in parallel in a short period of time.

Configuration of Cache

Figure 2:
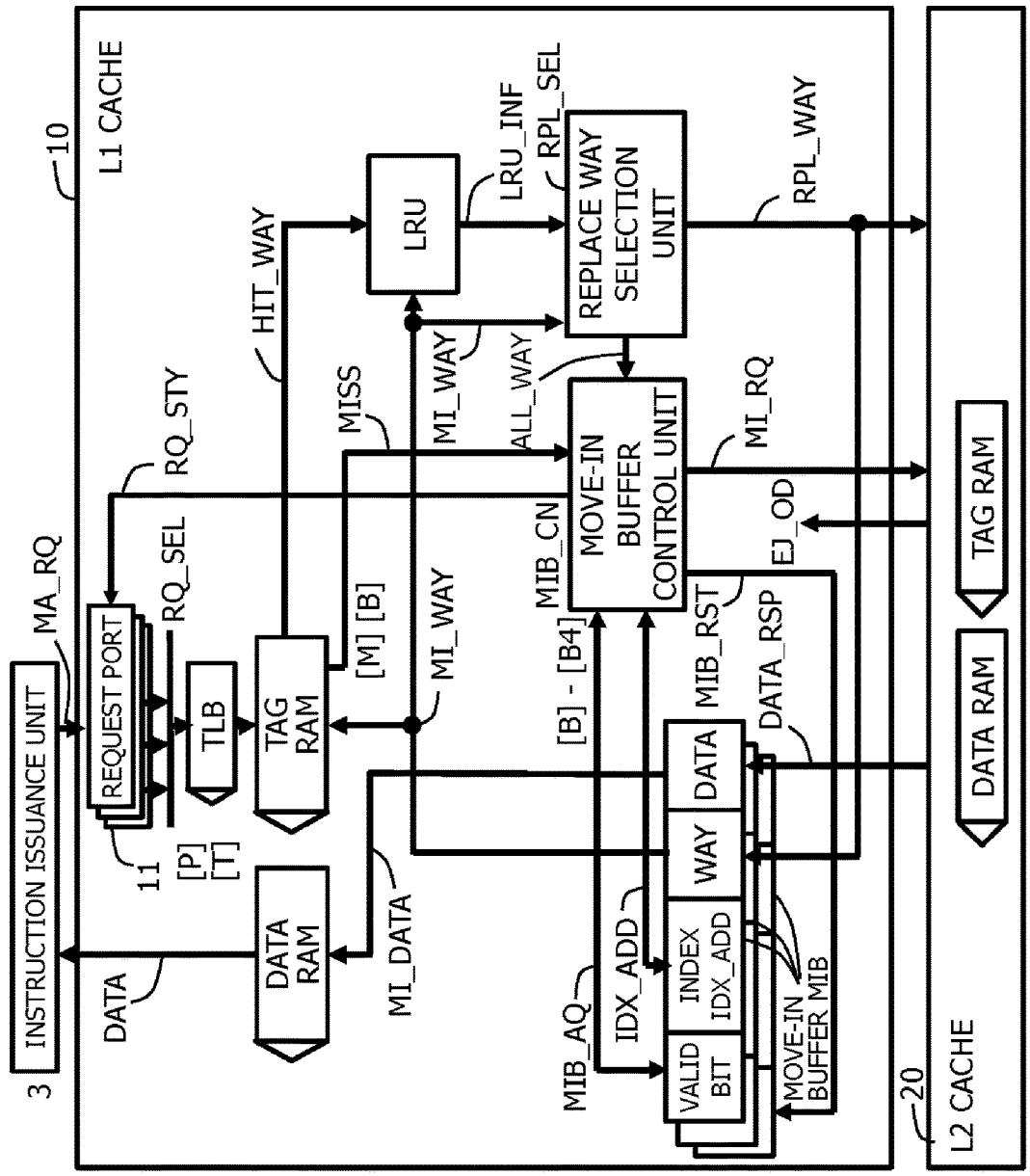
FIG. 2 is a diagram illustrating the configuration of the combination between the L1 cache and the L2 cache according to the embodiment.

FIG. 2 is a diagram illustrating the configuration of the combination between the L1 cache and the L2 cache according to the embodiment. The configuration of the combination between the L2 cache and the L3 cache is also the same. In addition, the configuration of the combination between the L3 cache and the memory access controller MAC is also the same except that the memory access controller MAC does not have a cache memory, i.e. DATA_RAM and TAG_RAM.

The L1 cache 10 has a plurality of request ports 11 that stores memory access requests MA_RQ issued from the instruction issuance unit 3, memory access requests RQ_STY staying in the request port, or the like, and has a request selection circuit RQ_SEL that selects any of requests inside the plurality of request ports based on prescribed priority. The request selection circuit RQ_SEL inputs a selected memory access request to a cache pipeline inside the L1 cache 10.

The cache pipeline is constituted by a translation lookaside buffer (TLB), a data memory DATA_RAM and a tag memory TAG_RAM constituting a cache memory, a move-in buffer control unit MIB_CN, an LRU circuit LRU, a replace way selection circuit RPL_SEL, or the like.

The TLB converts the logical address of a memory access request MA_RQ into a physical address. In the tag memory TAG_RAM, the validity, the states information, the way information, the address information, or the like of data registered in the cache is registered, and the tag memory TAG_RAM is referred to determine the cache hit of a memory access request. Then, the tag memory outputs way information HIT_WAY to the LRU circuit LRU when a cache hit occurs, and outputs a cache miss MISS to the move-in buffer control unit MIB_CN when the cache miss occurs.

The move-in buffer control unit MIB_CN acquires one move-in buffer MIB in response to the input of a memory access request to which a cache miss has occurred, registers the information of a move-in request MI_RQ in the move-in buffer MIB, and issues the move-in request MI_RQ to the L2 cache 20.

The LRU circuit determines the oldness of access to the respective ways of the cache memory (DATA_RAM and TAG_RAM) based on way information HIT_WAY to which a cache hit has occurred and the way information MI_WAY of a move-in request in a move-in buffer MIB, and outputs LRU information LRU_INF indicating the way of the earliest, least recent, access.

The replace way selection circuit RPL_SEL selects, based on LRU information LRU_INF from the LRU circuit, a replace way RPL_WAY indicating which way of the cache memory is used to register response data that is responded to a move-in request.

Move-In Buffer MIB

The move-in buffer MIB includes a plurality of move-in buffers to be capable of issuing a plurality of move-in requests at the same time. The respective move-in buffers MIB may also be called move-in buffer entries.

As described above, each of the move-in buffers MIB stores a valid bit VALID, an index address IDX_ADD, a replace way number WAY, and data DATA. For example, the valid bit VALID becomes "1" (valid) when the move-in buffer is acquired and becomes "0" (invalid) for releasing the move-in buffer when a move-in request is completed by the reception of a data response.

In addition, the index address IDX_ADD stores an index address ADD_2 of a memory access request MA_RQ. Accordingly, when securing a certain move-in buffer for a memory access request to which a cache miss has occurred, the move-in buffer control unit MIB_CN changes the valid bit VALID of the move-in buffer to "1" and registers the index address IDX_ADD of the memory access request to which the cache miss has occurred in the region of the index address IDX_ADD of the move-in buffer.

On the other hand, at a stage at which the move-in buffer is registered, ways for registering the data of a data response for the move-in request have not been determined yet, and thus the replace way numbers WAY of the move-in buffer have not been registered. Then, after securing the move-in buffer, the move-in buffer control unit registers a way number selected by the replace way selection unit in the move-in buffer when determining that the move-in request with the same index has not been registered in the move-in buffer or when determining that the move-in request with the same index has been registered but all the ways of the same index have not been used.

Moreover, when receiving the data response for the move-in request, the move-in buffer control unit stores the data of the response in the region of the data DATA of the move-in buffer.

The replace way selection unit RPL_SEL described above selects the replace way for the move-in request that is issued for the memory access request of the same index from among ways other than the way of the move-in request with the same index that has been registered in the move-in buffer. Therefore, the way information MI_WAY of the move-in request that has been registered in the move-in buffer is supplied to the replace way selection unit RPL_SEL.

In addition, an index match judgement circuit is provided in the move-in buffer control unit that judges whether the index of the memory access request and the index of the move-in request having been registered in the move-in buffer match each other. The match result of the index match judgement circuit is also supplied to the replace way selection unit R'+_SEL. From this match result and the way information MI_WAY of the move-in request, the replace way selection unit RPL_SEL acquires the information of the way of the move-in request with the same index that has been registered in the move-in buffer.

As will be described in detail later, the valid bits of the respective ways at the same index in the tag memory TAG_RAM are also supplied to the replace way selection unit RPL_SEL. When ways of which the valid bits are invalid among the four ways at the same index in the tag memory is other than the way of the move-in request that has been registered in the move-in buffer, the replace way selection unit selects a prescribed way from among the ways as a replace way without relying on LRU information. The selection corresponds to a case 1 that will be described later.

LRU information LRU_INF is also supplied to the replace way selection unit RPL_SEL. The replace way selection unit selects a replace way based on the LRU information from among ways other than the way of the move-in request with the same index that has been registered in the move-in buffer. The selection corresponds to a case 2 that will be described later.

In FIG. 2, the positions of the respective pipeline stages P, T, M, S, B, B1, B2, B3, and B4 of the pipeline circuit of the L1 cache are illustrated. The stages will be described in detail in the operation of the L1 cache below.

Configuration of Cache Memory

Figure 3:
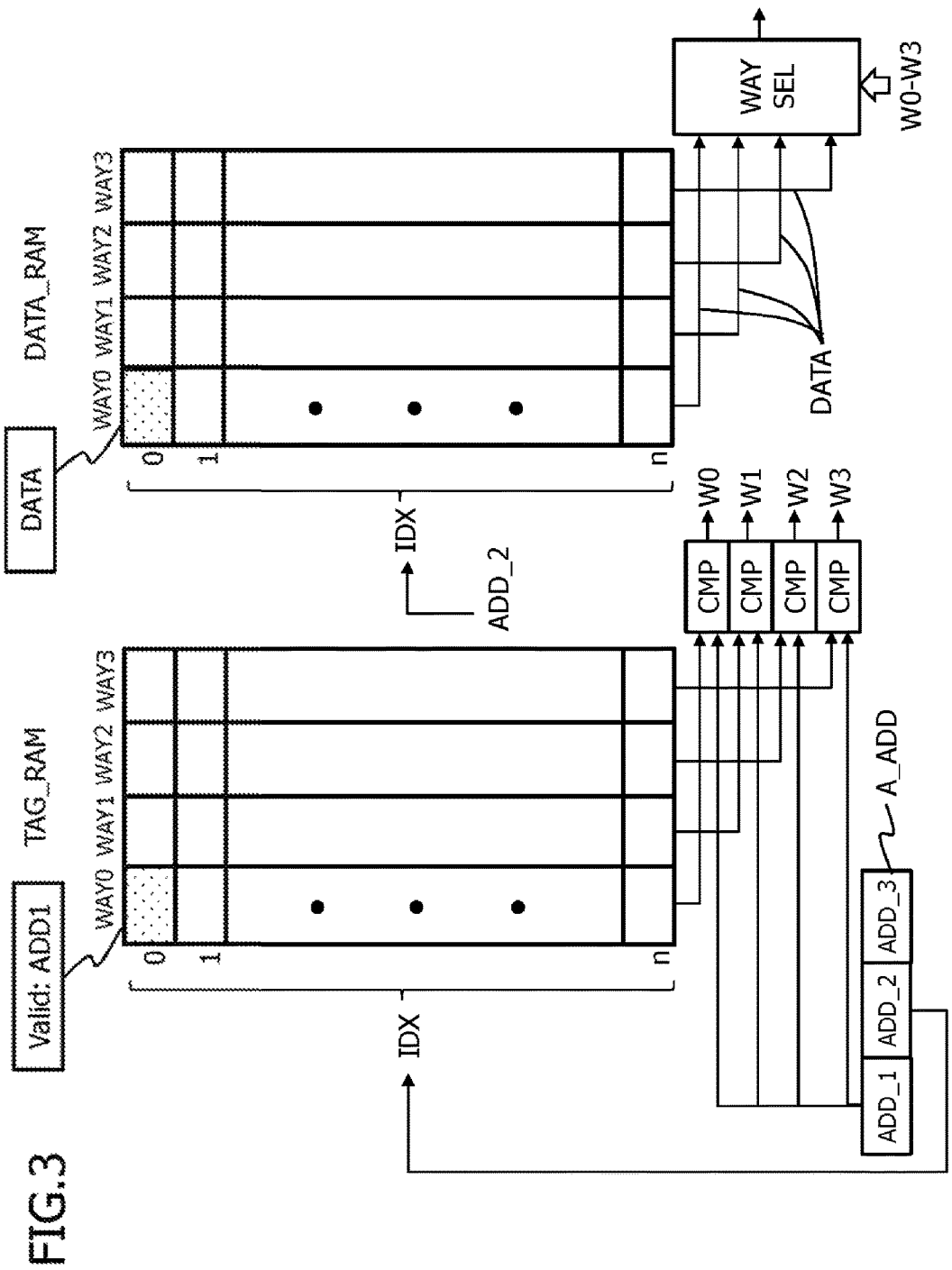
FIG. 3 is a diagram illustrating a configuration example of a cache memory.

FIG. 3 is a diagram illustrating a configuration example of a cache memory. The cache memory of FIG. 3 is an example of a four-way set associative cache memory. A tag memory TAG_RAM and a data memory DATA_RAM constituting the cache memory have cache lines or cache blocks with n+1 indexes (DX) 0 to n. Then, an address ADD_2 constituting a lower part of the access address A_ADD of a memory access request is input as an index address IDX to a decoder (not illustrated), and one index corresponding to the index address is selected. In addition, the upper address ADD_1 of the access address A_ADD (the upper address of a physical address obtained by converting a logical address with a TLB) is stored in the tag memory TAG_RAM. That is, a valid bit Valid and the upper address ADD_1 are stored in the cache lines in the tag memory TAG_RAM.

Then, four comparators CMP compare each of the addresses ADD_1 in the four ways of the indexes of the tag memory that is selected by the index address ADD_2 with the upper address ADD_1 of the access address A_ADD (the upper address of the physical address obtained by converting the logical address with the TLB). When the addresses ADD_1 and the upper address ADD_1 match each other, the comparators CMP set hit way information W0 to W3 at "1" (indicating a cache hit). When the cache hit occurs, one comparator sets the hit way information W0 to W3 at "1." When a cache miss occurs, all the four comparators CMP set the hit way information W0 to W3 at "0."

In addition, a way selector WAY_SEL selects, based on the hit way information W0 to W3, data DATA in the hit way from among the data DATA of the four ways selected by the index address ADD_13 2 from the data memory DATA_RAM.

Thus, the set associative cache memory collectively stores data DATA in the blocks of the cache at the index selected by the index address ADD_2. In addition, the cache memory registers the data DATA in the cache blocks of the number of ways (four ways in FIG. 3) at maximum at the index selected by the same index address ADD_2. Note that although not illustrated in FIG. 3, the lower address ADD_3 of the access address A_ADD is used to select access destination data from a selected cache block.

As described above, the index of the cache memory is selected by the index address ADD_2, and the same index is selected when the index address is the same. In the following description, for the sake of convenience, the index address ADD_2 of a memory access request will be called an index, and the index address IDX_ADD of a move-in request that has been requested and stored in a move-in buffer will be called an index as well.

Figure 4:
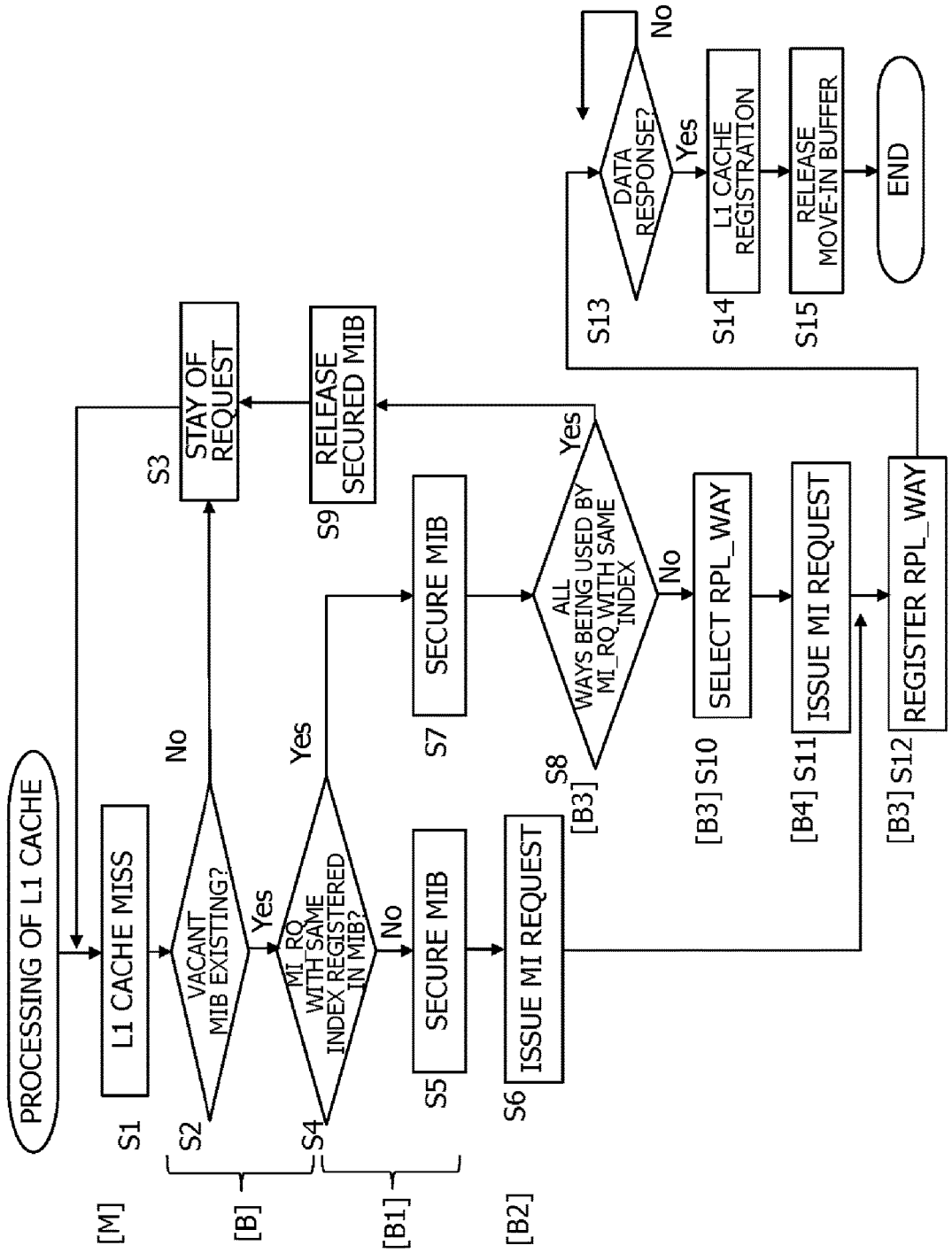
FIG. 4 is a flowchart diagram illustrating the operation of the L1 cache.
Figure 5:
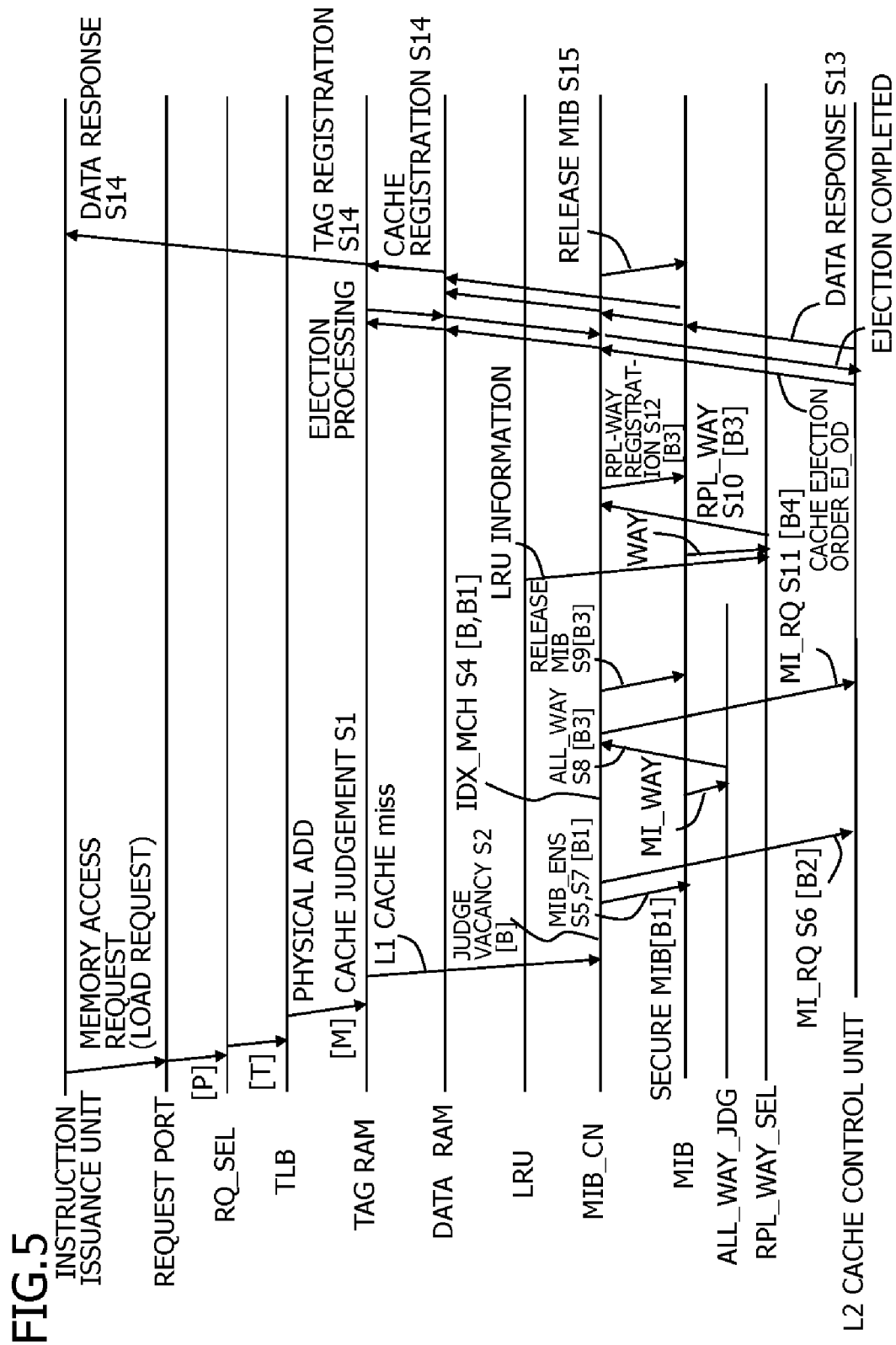
FIG. 5 is a sequence diagram illustrating the operation of the L1 cache.

Configurations of Move-In Buffer Control Unit and Replace Way Selection Unit and Operation of Cache FIG. 4 is a flowchart diagram illustrating the operation of the L1 cache. In addition, FIG. 5 is a sequence diagram illustrating the operation of the L1 cache. In each of FIGS. 4 and 5, the pipeline stages P, T, M, S, B, B1, B2, B3, and B4 of the cache are illustrated.

Figure 6:
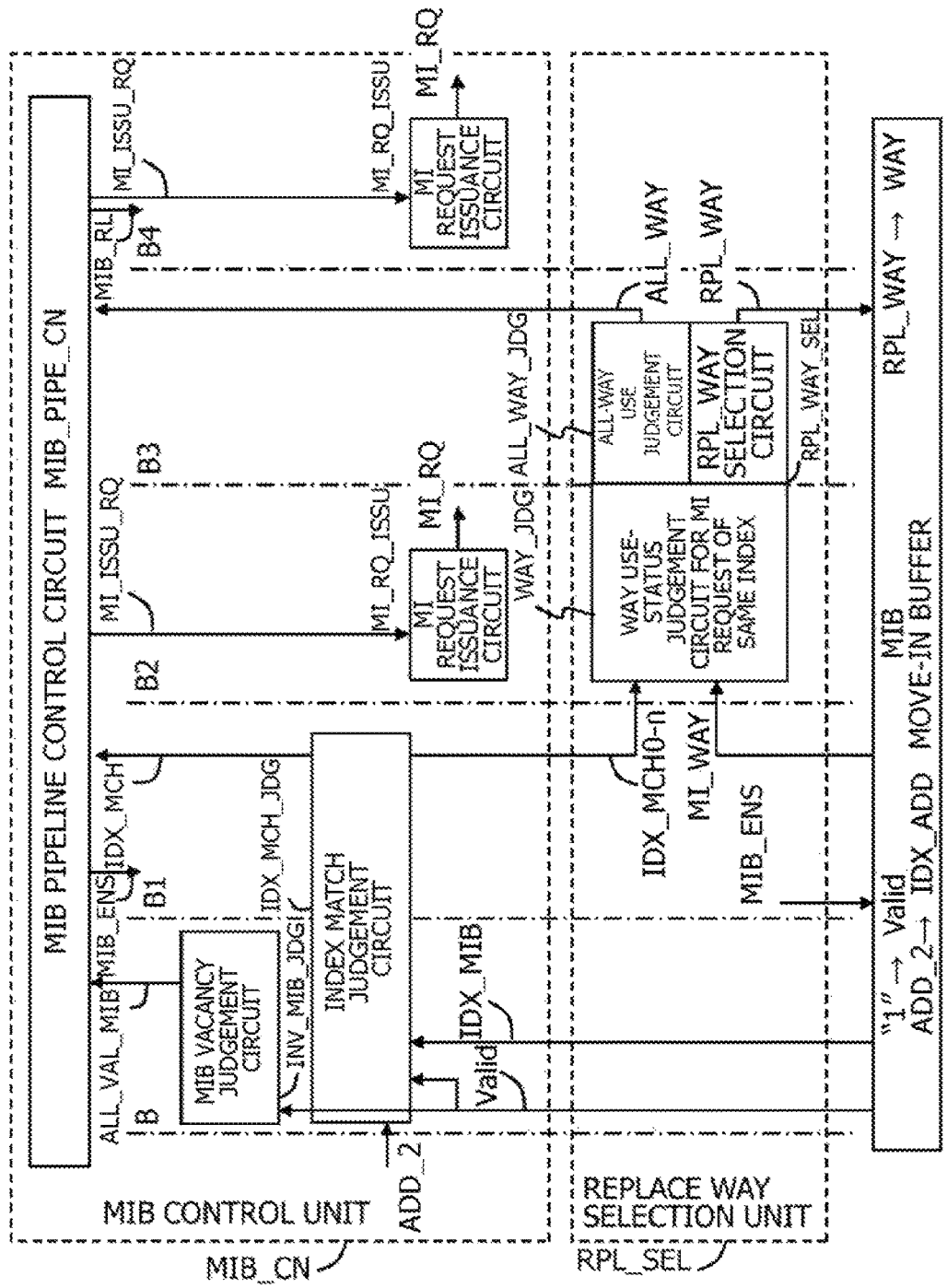
FIG. 6 is a diagram illustrating configuration examples of the move-in buffer control unit and the replace way selection unit.

FIG. 6 is a diagram illustrating configuration examples of the move-in buffer control unit and the replace way selection unit. The move-in buffer control unit MIB_CN has a MIB pipeline control circuit MIB_PIPE_CN, a move-in buffer vacancy judgement circuit INV_MIB_JDG, an index match judgement circuit IDX_MCH_JDG, and MI request issuance circuits MI_RQ_ISSU. In addition, the replace way selection unit RPL_SEL has a way use-status judgement circuit WAY_JDG for the move-in request with the same index, an all-way use judgement circuit ALL_WAY_JDG, and a replace way selection circuit RPL_WAY_SEL.

In FIG. 6 as well, the pipeline stages B, B1, B2, B3, and B4 of the move-in buffer control unit MIB_CN and the replace way selection unit RPL_SEL are illustrated.

The MIB vacancy judgement circuit INV_MIB_JDG of the MIB control unit MIB_CN is provided in the stage B. When the valid bits Valid of the move-in buffers MIB are input to the MIB vacancy judgement circuit, the MIB vacancy judgement circuit judges whether a move-in buffer of which the valid bit is invalid exists and outputs an all-valid move-in buffer signal ALL_VAL_MIB.

The index match judgement circuit IDX_MCH_JDG is provided in the stages B and B1, judges whether the index address ADD_2 of a memory access request matches any of the indexes IDX_MIB of move-in requests having been registered in the move-in buffers, and outputs an index match signal IDX_MCH. Further, the move-in request issuance circuits MI_RQ_ISS issue a move-in request MI_RQ in the stages B2 and B4.

On the other hand, the way use-status of the move-in request with the same index judgement circuit WAY_JDG in the replace way selection unit is provided in the B2 stage and judges a way use-status by a move-in request in which index match signals IDX_MCH0 to IDX_MCHn of respective move-in buffers MIB0 to MIBn generated by the index match judgement circuit become "1."

The all-way use judgement circuit ALL_WAY_JDG is provided in the B3 stage, judges whether all ways have been used based on the way use-status of the move-in request with the same index, and outputs an all-way use signal ALL_WAY.

In addition, the replace way selection circuit RPL_WAY_SEL is provided in the B3 stage, selects a way to be used by a newly-issued move-in request based on the way use-status of the move-in request with the same index or the like, and outputs a replace way signal RPL_WAY. When data has been registered in a cache block of the selected way, the data in the cache block of the way is replaced by data acquired in response to the move-in request.

The respective cache pipeline stages of the cache and the pipeline stages inside the move-in buffer control unit will be described below. After the description of the processing of the respective stages, the operation of the L1 cache will be described with reference to FIGS. 4, 5 and 6. Accordingly, when the processing contents of the respective stages below are referred to while reading the operation of the L1 cache in FIGS. 4, 5 and 6, the operation of the L1 cache may be well understood.

Processing Contents of Respective Stages

P stage: A determination is made as to whether a instruction is input to the pipeline.

T stage: An address is converted (from a logical address into a physical address) by the TLB to access the TAG memory and the DATA memory.

M stage: A determination is made as to whether a cache hit occurs. In the determination of the cache hit, the cache pipeline circuit retrieves the cache tag TAG_RAM with the index address ADD_2 of a memory access request and determines whether the addresses of all ways inside the cache tag corresponding to the index address and the address ADD_1 of the memory access request match each other as illustrated in FIG. 3.

B stage: (1) When the cache hit occurs, the cache pipeline circuit reads the data of four ways and selects and outputs the data of a cache block in a way number where the address ADD_1 matches. (2) When a cache miss occurs, the MIB vacancy judgement circuit INV_MIB_JDG of the move-in buffer control unit MIB_CN of FIG. 6 judges whether a vacant move-in buffer exists.

B1 stage: (1) When the cache hit occurs, the data of the data memory of the cache is returned to the instruction issuance unit to complete the processing of the memory access request. (2) When the cache miss occurs, the move-in buffer control unit issues a move-in buffer securing request MIB_ENS to secure the vacant move-in buffer MIB if it is determined that the vacant move-in buffer exists. In addition, the index match judgement circuit IDX_MCH_JDG starts judging whether the move-in request with the same index as the index of the memory access request has been registered in the move-in buffers.

B2 stage: (2) When the cache miss occurs, (2-1) the move-in request issuance circuit MI_RQ_ISSU of the move-in buffer control unit issues a move-in request MI_RQ if the move-in request with the same index has not been registered in the move-in buffers. (2-2) If the move-in request with the same index has been registered in the move-in buffers, the way use-status judgement circuit WAY_JDG inside the replace way selection unit RPL_SEL reads the way information WAY (MI_WAY) of the move-in request with the same index having been secured in the move-in buffers.

B3: stage: (2) When the cache miss occurs, (2-1) the replace way selection circuit RPL_WAY_SEL inside the replace way selection unit RPL_SEL outputs a way number RPL_WAY for registering the data of the move-in request if the move-in request with the same index has not been registered. (2-2) If the move-in request with the same index has been registered, the all-way use judgement circuit ALL_WAY$_{13}$ JDG inside the replace way selection unit RPL_SEL outputs a judgement result ALL_WAY as to whether all ways have been used by the move-in request with the same index. Then, if all the ways have been used, the MIB pipeline control circuit issues a move-in buffer release request MIB_RL to release the secured move-in buffer MIB in the next B4 stage. If all the ways have not been used, the replace way selection circuit RPL_WAY_SEL outputs the way number RPL_WAY for registering the data of the move-in request.

B4 stage: (2) When the cache miss occurs, the MIB pipeline control circuit issues the issue request MI_ISSU_RQ of the move-in request if all the ways have not been used and the move-in request issuance circuit MI_RQ_ISSU inside the move-in buffer control unit MIB_CN issues a move-in request MI_RQ.

Operation of L1 Cache

Next, the operation of the L1 cache will be described with reference to FIGS. 4, 5 and 6. First, a memory access request (a load request) issued by the instruction issuance unit (or the request issuance unit) is input from the request port to the cache pipeline by the request selection circuit RQ_SEL (P stage). Then, the logical address of the memory access request is converted into a physical address by the TLB (T stage). In addition, a determination is made as to whether a cache hit occurs by referring the tag memory TAG_RAM (S1 and M stages). When a cache miss occurs, the move-in buffer control unit MIB_CN receives an L1 cache miss.

In response to the reception of the L1 cache miss, the MIB vacancy judgement circuit INV_MIB_JDG of the move-in buffer control unit MIB_CN judges whether a vacant move-in buffer (invalid MIB) exists (S2 and B stages) to output the judgement signal ALL_VAL_MIB. As illustrated in the vacancy judgement circuit that will be described later in FIG. 7, the judgement is made by the confirmation of the valid bits of all the move-in buffers MIB.

When a vacant move-in buffer does not exist (NO in S2), a move-in request is not issued for the memory access request to which the cache miss has occurred since the securing of the move-in buffer is not allowed. Therefore, the move-in buffer control unit returns the memory access request to which the cache miss has occurred to the request port 11 (S3) to cause the memory access request to stay. This memory access request is prevented from being input to the cache pipeline until the next opportunity.

Moreover, the index match judgement circuit IDX_MCH_JDG of the move-in buffer control unit judges whether the move-in request with the same index as an index for the index address ADD_2 of the memory access request has been registered in the move-in buffers MIB (S4, B, and B1 stages). In the judgement, the index match judgement circuit IDX_MCH_JDG judges the match between each of all the index addresses IDX_ADD inside the move-in buffers MIB and the index address ADD_2 of the memory access request as will be described later.

When a vacant move-in buffer exists, the move-in buffer control unit issues move-in buffer securing MIB_ENS regardless of a judgement result IDX_MCH of the index match judgement circuit and secures a move-in buffer as the vacant move-in buffer for the memory access request to which the cache miss has occurred (S6 and B2 stages). In this move-in buffer securing processing, the move-in buffer control unit changes the valid bit of the vacant move-in buffer to "1" (valid) and stores the index address IDX_ADD (ADD_2) of the memory access request in the secured move-in buffer.

By the above speculative securing of the move-in buffer MIB, it is possible to issue a move-in request MI_RQ in the B2 stage when the move-in request with the same index has not been registered in the move-in buffers (S6 and B2 stages) and increase the processing efficiency of the pipeline circuit of the move-in buffer control unit.

When the index match judgement circuit IDX_MCH_JDG judges that the move-in request with the same index has not been registered in any of the move-in buffers MIB (IDX_MCH=0, NO in S4), the MIB pipeline control circuit MIB_PIPE_CN of the move-in buffer control unit causes the move-in request issuance circuit MI_RQ_ISSU to issue a move-in request MI_RQ (S6 and B2 stages).

However, when the move-in request with the same index has been registered (IDX_MCH=1 YES in S4), the MIB pipeline control circuit MIB_PIPE_CN waits for the outputs of the way use-status of the move-in request MI_RQ with the same index judgement circuit WAY_JDG, the all-way use judgement circuit ALL_WAY_JDG, and the replace way selection circuit RPL_WAY_SEL inside the replace way selection unit RPL_SEL.

That is, as illustrated in FIG. 6, the way use-status of the move-in request MI_RQ with the same index judgement circuit WAY_JDG input the match judgement results IDX_MCH0 to IDX_MCHn of the index match judgement circuit IDX_MCH_JDG between the index address ADD_2 of the memory access request and the index address IDX_ADD of each of the move-in buffers and all way information MI_WAY inside the move-in buffers, and judges way use-statuses by the move-in request with the same index (judges the use or unused statuses of the four ways by the move-in request MI_RQ).

In addition, the all-way use judgement circuit ALL_WAY_JDG judges whether all the four ways have been used based on the way use-statuses and outputs an all-way use determination ALL_WAY (S8 and B3 stages).

When the all-way use judgement ALL_WAY indicates that all the ways have not been used (ALL_WAY=0), the MIB pipeline control circuit MIB_PIPE_CN issues a move-in request issuance request MI_ISSU_RQ to cause the move-in request issuance circuit MI_RQ_ISSU to issue a move-in request MI_RQ (S11 and B4 stages). In addition, the replace way selection circuit RPL_WAY_SEL selects a way (replace way) for registering the data of the move-in request MI_RQ (S10 and B3 stages), outputs the selected replace way (RPL_WAY), and registers the way in the move-in buffer (S12 and B4 stages).

On the other hand, when all the ways have been used (ALL_WAY=1), the MIB pipeline control circuit MIB_PIPE_CN issues a MIB release request MI_RL for releasing the secured move-in buffer to the move-in buffer MIB (S9). As a result, the memory access request MA_RQ to which the cache miss has occurred is not allowed to secure the move-in buffer and thus is returned to the request port 11 (S3) to be caused to stay.

As described above, both (1) the judgement processing of the index match judgement circuit as to whether the move-in request having the same index as the index of a memory access request has been registered and (2) the judgement processing of the way use-status judgement circuit for the move-in request with the same index and the all-way use judgement circuit based on an index match determination result of the index match judgement circuit takes predetermined processing time. Therefore, a plurality of clock cycles is taken in the operation of the pipeline circuit that operates in synchronization with a high-frequency clock.

Therefore, when determining in the B stage that a vacant move-in buffer exists, the L1 cache of the embodiment first speculatively secures the move-in buffer in the next B1 stage. Thus, when judging that the move-in request with the same index has not been registered in the move-in buffers in the B stage, the L1 cache can issue a move-in request MI_RQ in the next B2 stage.

In addition, when the move-in request with the same index has been registered in the move-in buffers, the L1 cache waits for a judgement as to whether all ways have been used by the move-in request with the same index. After judging that all the ways have not been used, the L1 cache issues the move-in request in the B4 stage. A replace way selected by the replace way selection circuit RPL_SEL is registered in the move-in buffer after the issuance of the move-in request.

On the other hand, when all the ways have been used, a memory access request to which a cache miss has occurred competes with move-in requests that have been registered in the move-in buffer with all the ways and the same index. Accordingly, in this case, the L1 cache releases the speculatively secured move-in buffer MIB (MIB_RL).

Shortly, as illustrated in FIG. 5, an L2 cache control unit processes the move-in request MI_RQ to acquire requested data. Then, the L2 cache control unit returns a data response to the L1 cache (S13). When receiving the data response from the L2 cache control unit, the move-in buffer control unit of the L1 cache stores the data in the data region DATA of the move-in buffer MIB in which the move-in request MI_RQ has been registered. In addition, based on the index address IDX_ADD and the replace way RPL_WAY registered in the move-in buffer, the L1 cache registers the data of the data response in a block to be replaced in the data memory DATA_RAM of the L1 cache memory and registers the address ADD_1 and data state of the memory access request in the block to be replaced (block of the index and the way) in the tag memory TAG_RAM of the L1 cache (514). After the registration in the cache, the move-in buffer control unit invalidates the valid bit of the secured move-in buffer to release the move-in buffer (S15).

Note that when valid data has been registered in the cache block of the replace way of the cache memory, the L2 cache issues an order EJ_OD for ejecting the data in the cache block of the replace way and the index in the cache memory into the L2 cache memory before returning the data response as illustrated in FIG. 5. After the completion of ejecting the data from the cache memory, response data from the L2 cache is cache-registered in the cache block of the replace way. Finally, the L1 cache 10 returns a data response to the instruction issuance unit 3.

MIB Vacancy Determination Circuit and Index Match Determination Circuit

Figure 7:
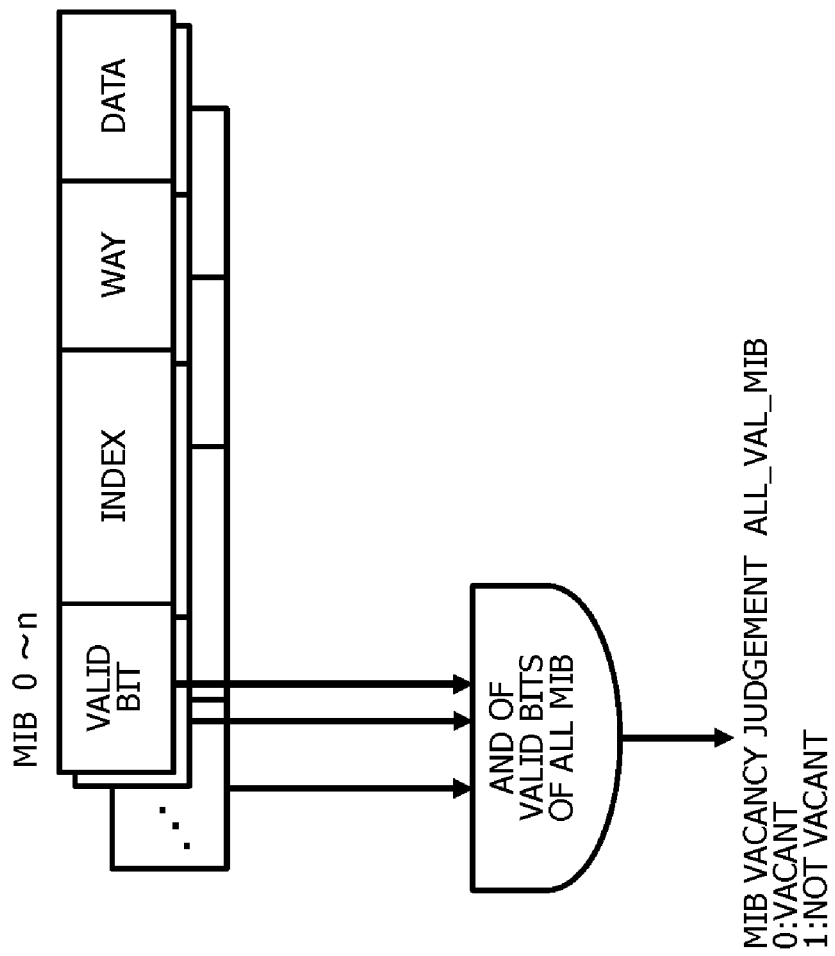
FIG. 7 is a diagram illustrating an example of the MIB vacancy judgement circuit inside the move-in buffer control unit.

FIG. 7 is a diagram illustrating an example of the MIB vacancy judgement circuit inside the move-in buffer control unit. The MIB vacancy judgement circuit INV_MIB_JDG is an AND gate that outputs the logical product (AND) of the valid bits of all the move-in buffers MIB as a move-in buffer vacancy judgement signal ALL_VAL_MIB. When the move-in buffers are secured, valid bits are changed to "1." Therefore, when all the move-in buffers are secured and no vacant move-in buffer exists, the MIB vacancy judgement circuit sets the MIB vacancy determination signal (all-valid MIB signal) ALL_VAL_MIB at "1." That is, the MIB vacancy judgement signal ALL_VAL_MIB=1 indicates that no vacant MIB exists, and ALL_VAL_MIB=0 indicates that a vacant MIB exists. Since only the logical AND of the valid bits is calculated, the MIB vacancy judgement circuit outputs the MIB vacancy determination signal ALL_VAL_MIB within one clock cycle.

Accordingly, since a vacant move-in buffer exists when the MIB vacancy judgement signal ALL_VAL_MIB is 0, indicating that the vacant move-in buffer exists, the MIB pipeline control circuit MIB_PIPE_CN issues a move-in buffer securing request MIB_ENS to the move-in buffer MIB in the next B1 stage as illustrated in FIG. 6. Thus, the valid bit of the move-in buffer of which the valid bit is invalid is changed to be valid when secured, and the index address IDX_ADD of a memory access request is written in the move-in buffer.

Figure 8:
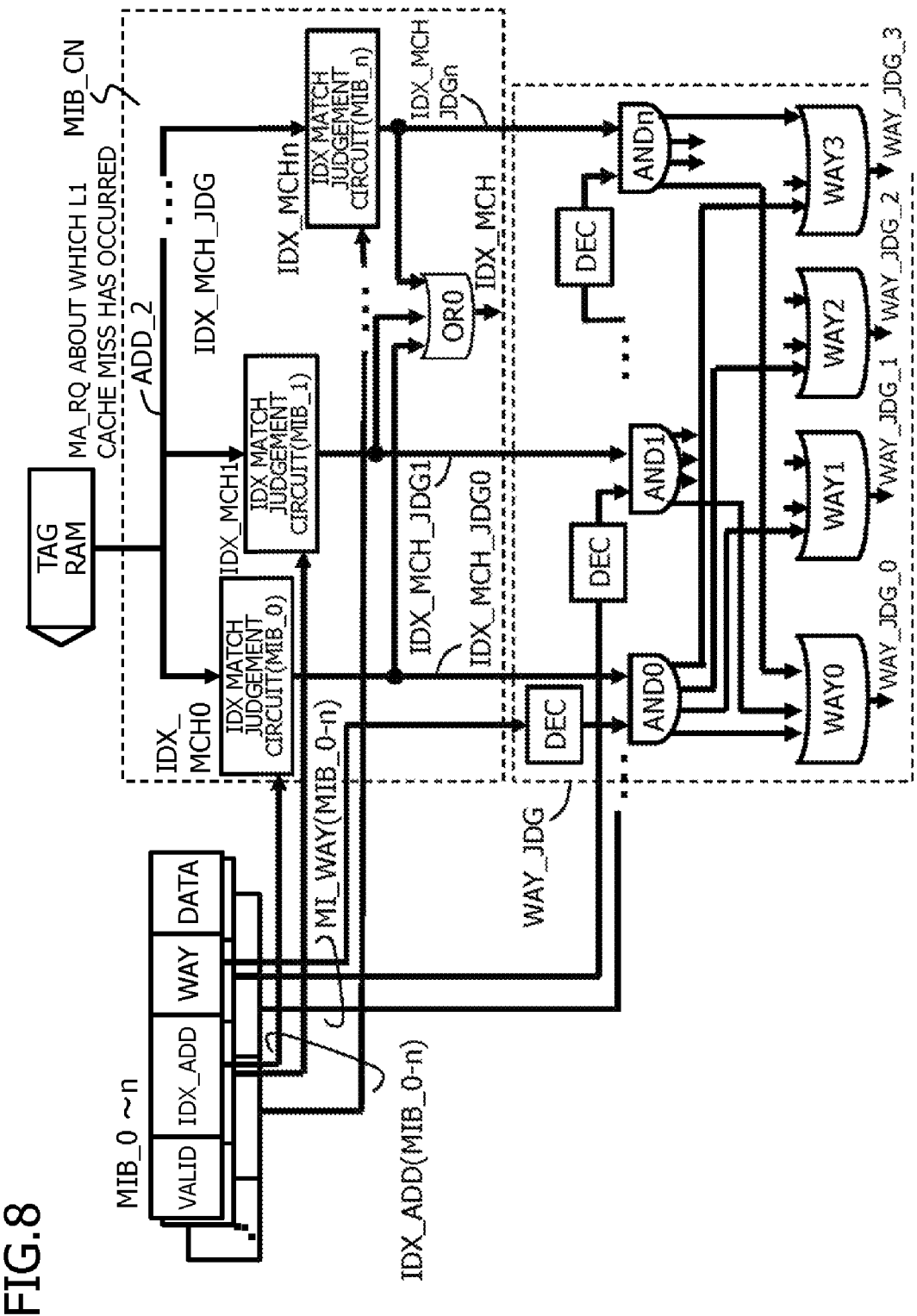
FIG. 8 is a diagram illustrating circuit examples of the index match judgement circuit IDX_MCH_JDG inside the move-in buffer control unit MIB_CN and the way use-status of the move-in request with the same index judgement circuit WAY_JDG inside the replace way selection unit RPL_SEL.

FIG. 8 is a diagram illustrating circuit examples of the index match judgement circuit IDX_MCH_JDG inside the move-in buffer control unit MIB_CN and the way use-status of the move-in request with the same index judgement circuit WAY_JDG inside the replace way selection unit RPL_SEL.

The index match judgement circuit IDX_MCH_JDG has n+1 index match judgement circuits IDX_MCH0 to IDX_MCHn and a logical OR circuit OR0 that outputs the logical sum of the outputs of the index match judgement circuits. Each of the n+1 index match judgement circuits IDX_MCH0 to IDX_MCHn judge the match between the index address ADD_2 of a memory access request MA_RQ to which a cache miss has occurred and each of all the index addresses IDX_ADD inside move-in buffers MIB. The logical OR circuit OR0 outputs an index match output IDX_MCH indicating the logical sum of the outputs IDX_MCH_JDG0 to IDX_MCH_JDGn (a match is indicated by "1" and a mismatch is indicated by "0") of the index match judgement circuits. The move-in buffer control unit MIB_CN determines whether the move-in request MI_RQ with the same index as the index of the index address ADD_2 of the memory access request to which the cache miss has occurred has been registered in the move-in buffers MIB by the index match output IDX_MCH of the index match judgement circuit IDX_MCH_JDG (S4 in FIG. 4).

Figure 9:
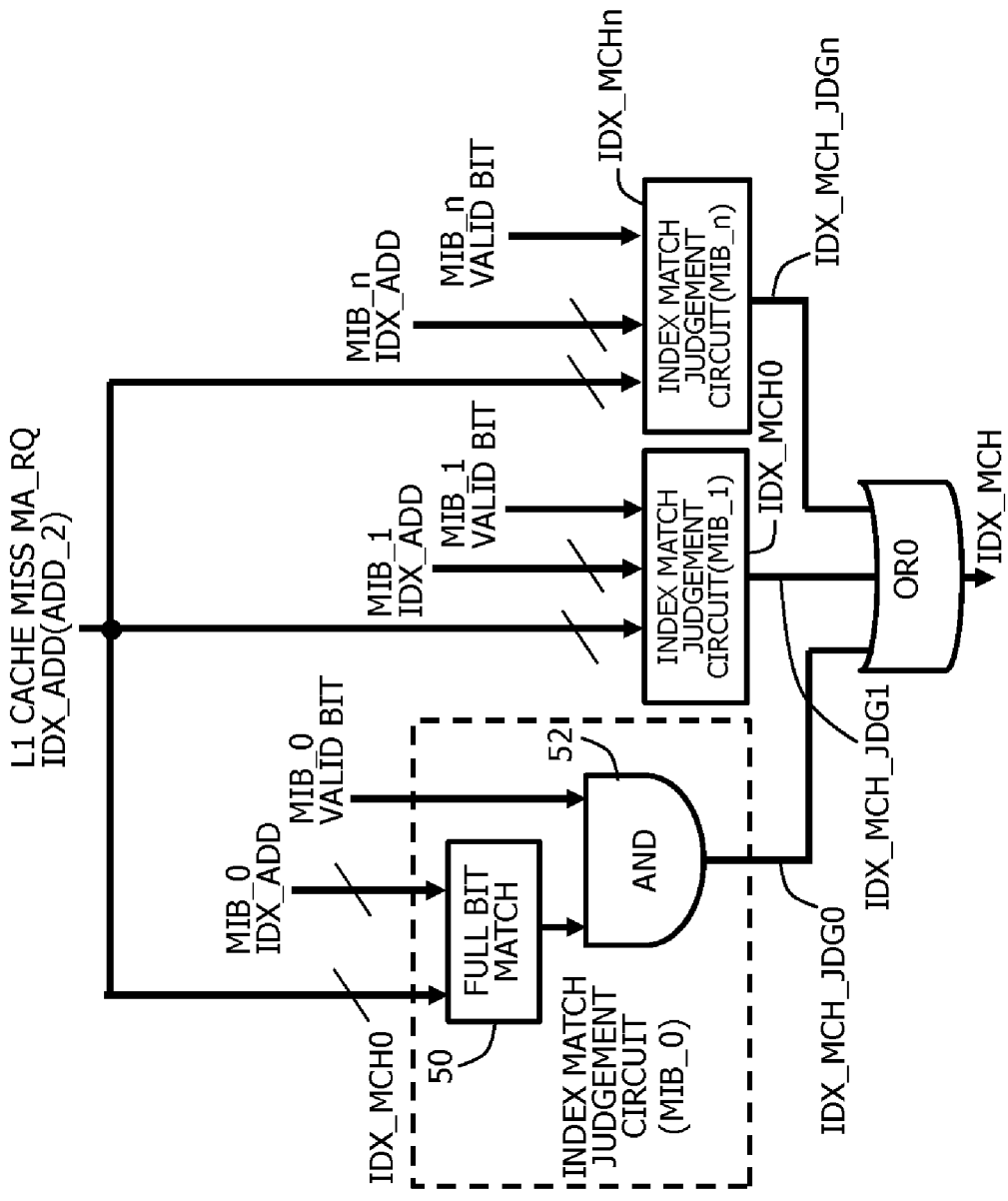
FIG. 9 is a diagram illustrating in further detail of an example of the index match judgement circuit IDX_MCH_JDG.

FIG. 9 is a diagram illustrating in further detail of an example of the index match judgement circuit IDX_MCH_JDG. In FIG. 9, the detailed configuration of an index match judgement circuit IDX_MCH0 that makes an index match determination about a move-in buffer MIB_0 is illustrated. The index match judgement circuit IDX_MCH0 has a full bit match circuit 50 that judges the match of the respective bits between the index address IDX_ADD of the move-in buffer MIB_0 and the index address IDX_ADD (ADD_2) of a memory access request MA_RQ to which a cache miss has occurred, and has an AND gate 52 that outputs the logical product of the output of the full bit match circuit 50 and the valid bit of the move-in buffer MIB_0.

By this circuit, a judgement is made as to whether the index address IDX_ADD of a move-in buffer in which a move-in request has been registered and the index address IDX_ADD (ADD_2) of a memory access request MA_RQ match each other. The full bit match circuit 50 is constituted by, for example, a bit-number corresponding EOR circuit that outputs the exclusive OR (EOR) of the corresponding bits of two inputs and an AND circuit that outputs the logical product of the outputs of the EOR circuit. Accordingly, the processing time of the full bit match circuit 50 becomes relatively long, and two clock cycles are necessary to output the judgement result of the index match judgement circuit in the example of FIG. 6.

Way Use-Status Judgement Circuit WAY_JDG, All-Way Use Judgement Circuit ALL_WAY_JDG, and Replace Way Selection Circuit RPL_WAY_SEL inside Replace Way Selection Unit The way use-status judgement circuit WAY_JDG inside the replace way selection unit RPL_SEL of FIG. 8 has n+1 decoders DEC that decode the way number (2 bits) (MI_WAY) of move-in requests MI_RQ having been registered in all the move-in buffers MIB_0-n, respectively, and has AND circuits AND0 to ANDn that output the logical products of the outputs of the respective index match judgement circuits IDX_MCH0 to IDX_MCHn and the outputs of the respective decoders DEC.

The decoders DEC decode the way numbers of four ways (00-11 in binary form) and output a four-bit decode signal. That is, when a replace way number is "10," the decoders DEC convert the way number into the code
indicating that the third place is a replace way. Accordingly, the position of "1" in the four-bit code indicates the position of the replace way.

Next, the AND circuits AND0 to ANDn output the four-bit outputs of the decoders DEC as they are when the judgement outputs IDX_MCH_JDG0 to IDX_MCH_JDG-n of the respective index match judgement circuits are "1" (match), and output the code [0000] in which all the four bits are 0 when the judgement outputs are "0" (mismatch).

Further, the way use-status judgement circuit WAY_JDG has logical OR circuits WAY0 to WAY3 that output the respective logical sums of the four-bit outputs of the 1+n AND circuits. The respective logical OR circuits WAY# receive n+1 bits corresponding to the four-bit outputs of the AND circuits and output way use-status judgement signals WAY_JDG_0 to WAY_JDG_3 as their logical sums. When the way use-status judgement signals WAY_JDG_0 to WAY_JDG_3 are "0," an unused status is indicated. When the way use-status judgement signals WAY_JDG_0 to WAY_JDG_3 are "1," a used status is indicated.

Figure 10:
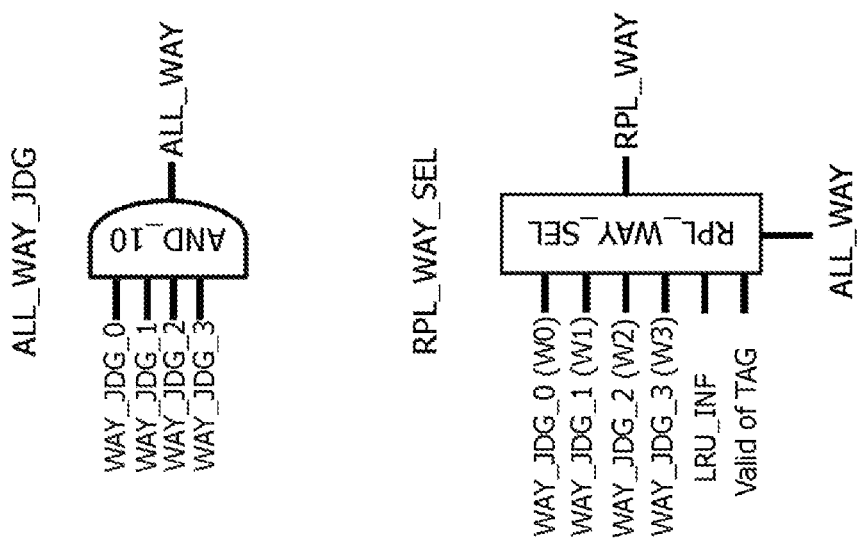
FIG. 10 is a diagram illustrating the all-way use judgement circuit ALL_WAY_JDG and the replace way selection circuit RPL_WAY_SEL inside the replace way selection unit.

FIG. 10 is a diagram illustrating the all-way use judgement circuit ALL_WAY_JDG and the replace way selection circuit RPL_WAY_SEL inside the replace way selection unit RPL_SEL.

The all-way use judgement circuit ALL_WAY_JDG is a logical product circuit AND_10 that outputs the logical product of the way use-status determination signals WAY_JDG_0 to WAY_JDG_3 indicating the four outputs of the way use-status judgement circuit WAY_JDG of FIG. 8 as an all-way use determination signal ALL_WAY. When the four outputs of the way use-status judgement circuit WAY_JDG, i.e., all the way use-status judgement signals WAY_JDG_0 to WAY_JDG_3 are "1" (used), the all-way use judgement signal ALL_WAY becomes "1" and a judgement result indicating that all the ways have been used by a move-in request registered in the move-in buffer MIB is output.

The replace way selection circuit RPL_WAY_SEL receives the four outputs of the way use-status judgement circuit WAY_JDG, i.e., the way use-status judgement signals WAY_JDG_0 to WAY_JDG_3, LRU information LRU_INF, the valid bits Valid of the four ways of the tag memory corresponding to the index of a move-in request, and the all-way use judgement signal ALL_WAY, and outputs a replace way number RPL_WAY through prescribed logical computation.

FIG. 11 is a flowchart diagram illustrating the operation of the replace way selection unit. The replace way selection unit RPL_SEL receives LRU information LRU_INF from the LRU circuit and the valid bit of cache blocks of a way from the tag memory TAG_RAM (S20). The LRU circuit outputs the earliest-accessed way number as the LRU information based on the access histories of four ways in respective indexes. In addition, the tag memory has valid bits indicating whether cache registration has been made in the respective four ways. Moreover, the replace way selection unit receives the way information MI_WAY of the move-in request with the same index from move-in buffers (S21).

Then, when an all-way use judgement signal ALL_WAY from the all-way use judgement circuit ALL_WAY_JDG is "1" (YES in S22), all the ways have been used by the move-in request with the same index and therefore the issuance of a new move-in request is not allowed. Accordingly, the move-in buffer pipeline control circuit issues a move-in buffer release request MIB_RL to release the secured move-in buffer (S23).

When the all-way use judgement signal ALL_WAY is "0" indicating that all the ways have not been used (NO in S22), the replace way selection circuit RPL_WAY_SEL selects a way (replace way) to be used by a newly-issued move-in request based on the LRU information LRU_INF, way use-status judgement signals WAY_JDG_0 to WAY_JDG_3 (W0 to W3), and a valid bit Valid (S24). Then, the replace way selection unit registers the selected replace way in the way region of the move-in buffer MIB in which the move-in request is to be registered and notifies the L2 cache of replace way information RPL_WAY (S25).

Truth Tables of Replace Way Selection Circuit Inside Replace Way Selection Unit

FIG. 12 is a diagram illustrating the truth tables of the replace way selection circuit RPL_SEL. As described above, the replace way selection circuit RPL_WAY_SEL inside the replace way selection unit RPL_SEL receives LRU information LRU_INF, way use-status judgement signals WAY_JDG_0 to WAY_JDG_3 (W0 to W3), and valid bits Valid.

Case 1: When an Invalid Way Exists at the Same Index in the TAG Memory of L1 Cache First, when an invalid way exists at the same index in the tag memory of the L1 cache (valid bit Valid=0) and the invalid way is not used by a move-in requests having secured a move-in buffer (way use-status judgement signals WAY_JDG_0 to WAY_JDG_3=0), the replace way selection circuit selects a replace way (RPL_WAY) based on a truth table illustrated in the case 1 of FIG. 12.

The case 1 illustrates the combinations (patterns 1-1 to 1-4) of ways that satisfy two conditions in which four ways (W0, W1, W2, and W3) are invalid at the same index in the tag memory and are not used and not acquired by a move-in request(s) having secured a move-in buffer, and illustrates replace ways (RPL_WAY) corresponding to the respective patterns.

The replace way selection circuit selects any of the ways that satisfy the two conditions as a replace way (RPL_WAY) based on the truth table of the case 1. Since the invalid ways exist in the tag memory, the selection of the replace way based on LRU information is not performed.

Note that in the truth table of the case 1 of FIG. 12, low-numbered ways are selected preferentially. For example, when the way that satisfies the two conditions is a way W0 in the pattern 1-1, the replace way selection circuit selects the way W0 as a replace way regardless of the other ways (W1, W2, and W3). In the pattern 1-2, when the way W0 does not satisfy the two conditions but the way W1 satisfies the two conditions, the replace way selection circuit selects the way W1 as a replace way regardless of the other ways (W2 and W3). The same applies to cases 1-3 and 1-4. However, high-numbered ways may be selected preferentially, or ways may be selected randomly.

In the case 1, since valid data has not been registered in the invalid ways of the tag memory, the L1 cache is not preferable to perform an ejection order for ejecting the data to the L2 cache. Accordingly, since a move-in request may use the ways that satisfy the two conditions without performing replacement, the ways are not exactly replace ways.

In the case 1, a reason why the replace way selection circuit selects the way that satisfies the two conditions as a replace way is as follows. Even if a way is invalid in the tag memory at the same index, the way may be registered in a move-in buffer as the way of a move-in request that has been issued in a move-in buffer. For example, there is a case that an invalid way in the tag memory exists but a preceding memory access request, which a cache miss has occurred to and has secured a move-in buffer, has acquired the same way. In this case, the replace way selection circuit does not select the way as a replace way.

Case 2: When No Invalid Way Exists at the Same Index in the TAG Memory of L1 Cache Second, when no invalid way exists at the same index in the tag memory of the L1 cache, the replace way selection circuit selects a replace way based on a truth table illustrated in the case 2 of FIG. 12. In the case 2, all ways at the same index in the tag memory of the L1 cache have valid data registered therein. Accordingly, an ejection order is preferably performed with respect to a replace way. Therefore, in the case 2, the replace way selection circuit selects the earliest-accessed way as a replace way based on LRU information from among ways other than a way used by the move-in request with the same index having been registered in move-in buffers (a way other than ways having secured the move-in buffer). The move-in request with the same index that has been registered in the move-in buffers uses the way of which the way use-status judgement signals WAY_JDG_0 to WAY_JDG_3 (W0 to W3) are "1", which is a way of MI_RQ having secured the move-in buffer (MIB).

The case 2 depicts LRU truth tables (1) to (11) for reference of (patterns 2-1 to 2-11) or replace ways of (patterns 2-12 to 2-15) for each of the 15 types of way combinations (patterns 2-1 to 2-15) of the move-in request MI_RQ with the same index that have secured a move-in buffer about four ways. In the truth tables, ways used by MI_RQ with the same index that have secured the move-in buffer are denoted by "1," which is equivalent to a state in which the way use-status judgement signals WAY_JDG_0 to WAY_JDG_3 (W0 to W3) are "1." Accordingly, ways not used by MI_RQ with the same index in the move-in buffer are denoted by "0."

The patterns 2-1 to 2-11 are cases in which a plurality of (four, three or two) ways (0) that are not used by MI_RQ with the same index having secured the move-in buffer exists. In this case, as illustrated in the respective LRU truth tables (1) to (11), the replace way selection circuit selects the earliest-accessed (least recently used) way (the way of the LRU) as a replace way (RPL_WAY) from among the ways that have not being used by MI_RQ with the same index in the move-in buffer. On the other hand, since the patterns 2-12 to 2-15 have only one way that has not being used by MI_RQ with the same index in the move-in buffer, the replace way selection circuit selects the not used way by MI_RQs with the same index as a replace way regardless of LRU information.

In the pattern 2-16, all the four ways have being used by MI_RQs with the same index in the move-in buffer. In this case, the all-way use judgement circuit ALL_WAY_JDG outputs an all-way use judgement signal ALL_WAY (ALL_WAY=1).

Control Example of Move-In Buffer

Figure 13:
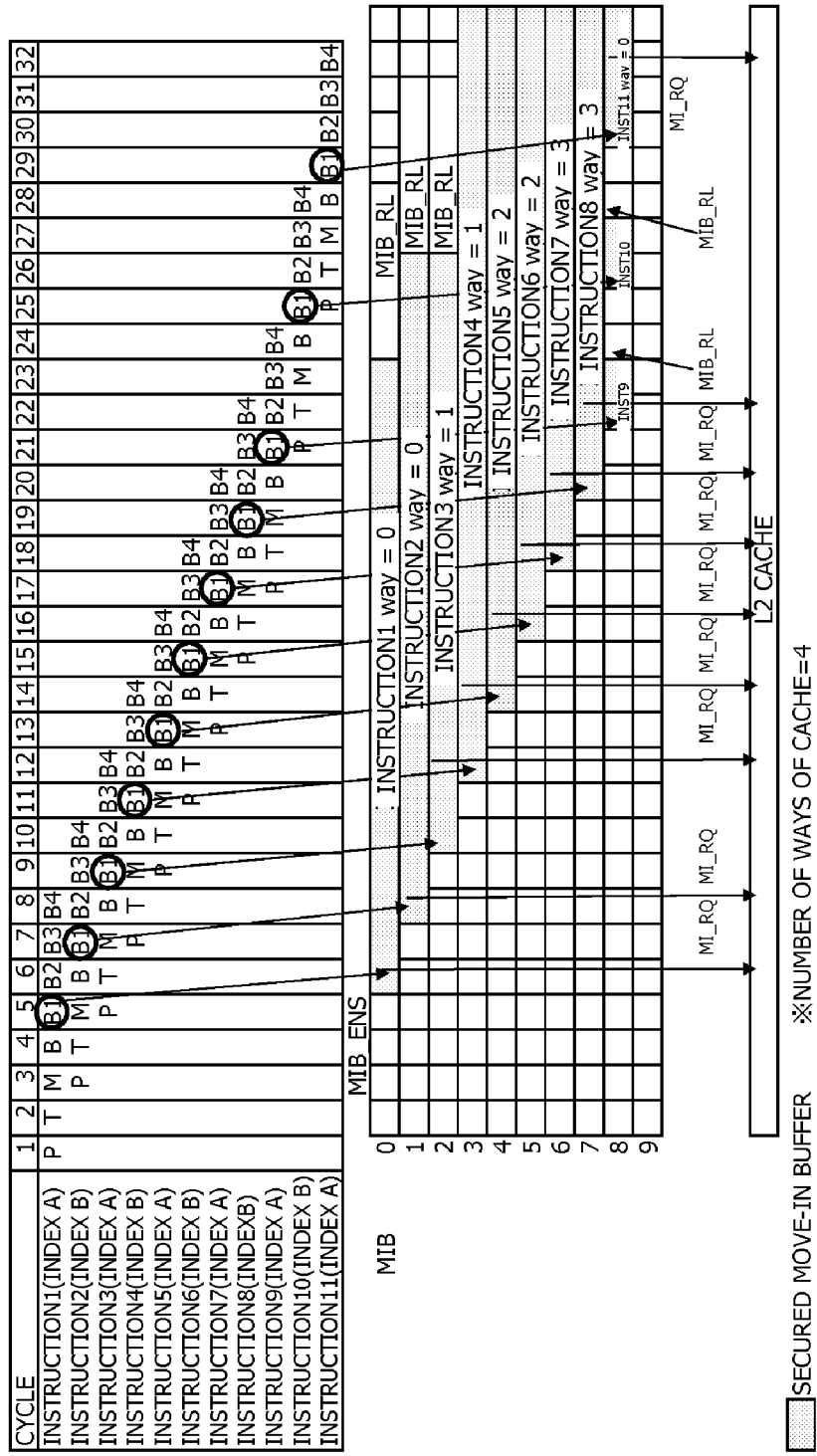
FIG. 13 is a timing chart diagram illustrating move-in buffer control by the move-in buffer control unit of the L1 cache in the embodiment.

FIG. 13 is a timing chart diagram illustrating move-in buffer control by the move-in buffer control unit of the L1 cache in the embodiment. FIG. 13 is based on the assumption that the index addresses ADD_2 of all instructions 1 to 11 are A or B, the number of ways is four, no invalid way exists at the same index in the tag memory of the L1 cache, and ten move-in buffers MIB are provided.

FIG. 13 illustrates instructions 1 to 9 input to the L1 cache for every two cycles and instructions 10 and 11 input later to the L1 cache for every four cycles. Here, an instruction issued by the instruction issuance unit is a load instruction, and a memory access request is correspondingly input to the L1 cache. In addition, FIG. 13 illustrates instructions that have secured the move-in buffers and way numbers therefor.

First, for the instruction 1 with the index A, the processing reaches the B stage in a cycle 4, and the MIB vacancy judgement circuit judges the existence of a vacant move-in buffer. Then, in the B1 stage of a cycle 5, the MIB pipeline control circuit issues a move-in buffer MIB securing request MIB_ENS to secure a move-in buffer MIB_0 for the instruction 1. In addition, since the move-in request with the same index A has not been registered in the move-in buffers, a move-in request MI_RQ is issued to the L2 cache in the B1 stage. The issuance timing of the move-in request is fast since the move-in request is issued in two cycles after being input to the move-in buffer control unit. Moreover, WAY=0 is registered in the move-in buffer MIB_0.

Next, for the instruction 2 of the index B, the processing reaches the B stage in a cycle 6, and the MIB vacancy judgement circuit judges the existence of a vacant move-in buffer. Then, in the B1 stage of a cycle 7, the MIB pipeline control circuit issues a move-in buffer securing request MIB_ENS to secure a move-in buffer MIB 1 for the instruction 2. In addition, since the move-in request with the same index B has not been registered in the move-in buffers, in the B1 stage a move-in request MI_RQ is issued to the L2 cache and WAY=0 is registered in the move-in buffer MIB_1. Since the instruction 2 has the index B different from the index A of the instruction 1, a way used by the move-in request for the instruction 2 may use the same way as the way used for the instruction 1, i.e., the way 0.

Similarly, the instructions 3, 5, and 7 of the index A secure move-in buffers MIB 2, 4, and 6, respectively, and ways used by move-in requests are ways 1, 2, and 3. On the other hand, the instructions 4, 6, and 8 of the index B secure move-in buffers MIB 3, 5, and 7, respectively, and ways used by move-in requests are ways 1, 2, and 3. Since the move-in request with the same index A has been registered in the move-in buffers, move-in requests MI_RQ are issued in their B4 stages for the instructions 3, 5, and 7 of the index A. For instructions 4, 6, and 8 of the index B as well, move-in requests MI_RQ are issued in their B4 stages.

The next instruction 9 of the index A temporarily secures a move-in buffer MIB_8 according to a move-in buffer securing request MIB_ENS in the B1 stage of a cycle 21. However, since the move-in requests with the same index A have used all the ways, an all-way use signal ALL_WAY becomes 1 in the B3 stage of a cycle 23. In the B4 stage of the next cycle 24, the move-in buffer secured by the instruction 9 is released by a move-in buffer release request MIB_RL.

Similar to the instruction 9, the instruction 10 of the next index B temporarily secures the move-in buffer, but the move-in buffer is released afterwards.

Further, since the move-in buffer MIB_0 having been secured by the instruction 1 is released, the instruction 11 of the index A does not release a secured move-in buffer and the way 0 is selected as a way used by a move-in request.

FIG. 14 is a diagram for describing the processing of successive instructions. In FIG. 14, a horizontal direction indicates clock cycles 0 to 8, and a vertical direction indicates successive instructions 1 to 5. In the respective cells, the pipeline stages B1 to B4 of the respective instructions are illustrated. Based on FIG. 14, a reason why the instructions 1 to 8 are processed for every two clock cycles in FIG. 13 will be described.

A instruction 1 is input in a cycle 0. As described in FIG. 6, a judgement is made as to whether a vacant MIB exists in the B stage, a judgement is made as to whether an index matches in the B1 stage, the replace way selection unit reads way information MI_WAY from the move-in buffer MIB in the B2 stage, and a replace way (RPL_WAY) is selected and registered in the move-in buffer in the B3 stage. Accordingly, after the B4 stage, the move-in buffer is allowed to refer to the information of the replace way RPL_WAY registered in the B3 stage.

A instruction 2 is input in a cycle 1 in succession to the input of the instruction 1. Therefore, in the B2 stage of the instruction 2 in which way information MI_WAY is read from a move-in buffer, the registration of the replace way (RPL_WAY) of the instruction 1 in the move-in buffer has not been completed. Therefore, the registration of the replace way of the instruction 1 is not reflected on the way information MI_WAY read from the move-in buffer in the B2 stage of the instruction 2.

In view of the problem, the move-in buffer control unit aborts the instruction 2 and returns the same to the request port to be caused to stay on the ground that the B2 stage of the instruction 2 corresponds to the B3 stage of the instruction 1. For this reason, the instructions 1 to 9 are displayed for every two clock cycles in FIG. 13. In FIG. 14, the instructions input after one clock cycle from preceding instructions are aborted and caused to stay as described above.

As described above, according to the embodiment, (1) when a cache miss occurs, the move-in buffer control unit speculatively secures a move-in buffer for a memory access request to which the cache miss has occurred in the B1 stage if the vacant move-in buffer exists in the B stage. Then, when the move-in request with the same index has not been registered in the move-in buffers, a move-in request is issued in the B2 stage. Thus, when the move-in request with the same index has not been registered, it is possible to issue a move-in request in a short cycle, because the move-in buffer has been secured for the memory access request already.

On the other hand, (2) when the move-in request with the same index has been registered in the move-in buffers, the L1 cache waits for a judgement as to whether all ways have been used by the move-in request with the same index in the move-in buffer. When all the ways have not been used, the L1 cache issues the move-in request in the B4 stage. When a way to be used by the move-in request is selected afterwards, the selected way (replace way) is registered in the secured move-in buffer.

According to the embodiment, (3) when all ways have not been used by the move-in request with the same index even if the move-in request with the same index as a memory access request to which a cache miss has occurred in the L1 cache has been registered in a move-in buffer, a move-in request that uses an unused way is registered in the move-in buffer and issued to the L2 cache. Thus, it is possible to increase the number of simultaneously-issuable move-in requests and efficiently process the move-in requests.

In addition, (4) for the memory access request with an index different from the index of a move-in request that has been registered, a move-in request is issued in the B2 stage after two clocks since the input of a instruction to the move-in buffer control unit. On the other hand, for the memory access request with the same index as the index of a move-in request that has been registered, a move-in request is issued in the B4 stage. Thus, it is possible to increase a clock frequency for controlling the pipeline stages. In addition, it is possible to accelerate the issuance timing of the former move-in request.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing unit comprising:
a memory access request issuance unit configured to issue a memory access request; and
a cache including
a cache memory including a tag memory and a data memory, states of data and data being registered in a block at an index that matches with matching an index of the memory access request inside the tag memory and the data memory,
a move-in buffer control unit that issues a move-in request to register data of the memory access request in the cache when the memory access request causes a cache miss, and
a plurality of move-in buffers each of which registers information of the move-in request, wherein,
the move-in buffer control unit, in response to an input of the memory access request to which the cache miss occurs,
(a) secures a vacant move-in buffer for the memory access request when judging that the vacant move-in buffer exists in the plurality of move-in buffers,
(b) issues a move-in request of the memory access request having secured the move-in buffer when judging that a move-in request having a same index as an index of the memory access request has not been registered in any of the plurality of move-in buffers,
(c) issues the move-in request of the memory access request having secured the move-in buffer when judging that the move-in request having the same index has been registered in any of the plurality of move-in buffers and further judging that all ways serving as replace ways have not been used by the move-in request having the same index that has been registered in any of the plurality of move-in buffers, and
(d) releases the secured move-in buffer and prevents an issuance of the move-in request when judging that all the ways have been used.

2. The arithmetic processing unit according to claim 1, wherein
the move-in buffer control unit has a pipeline circuit configured to process the input memory access request, to which the cache miss has occurred, in synchronization with a clock, and successively performs the above processing (a), (b), (c), and (d).

3. The arithmetic processing unit according to claim 2, wherein
each of the plurality of move-in buffers stores, as the information of the move-in request, a valid bit, the index of the memory access request, a way inside the cache memory, in which data of a data response that is returned in response to the move-in request is registered, and the data of the data response.

4. The arithmetic processing unit according to claim 3, wherein
the move-in buffer control unit includes a vacancy judgement circuit configured to judge whether the vacant move-in buffer, the valid bit of which is invalid, exists in the plurality of move-in buffers, and
the move-in buffer control unit validates the valid bit of the vacant move-in buffer to secure a move-in buffer for the memory access request and registers the index of the memory access request in the secured move-in buffer when the vacant judgement circuit judges the existence of the vacant move-in buffer in the (a).

5. The arithmetic processing unit according to claim 3, wherein
the move-in buffer control unit includes an index match judgement circuit configured to judge whether the move-in request having the same index has been registered in any of the plurality of move-in buffers, and
the move-in buffer control unit issues the move-in request of the memory access request having secured the move-in buffer when the index match judgement circuit judges that the move-in request having the same index has not been registered in any of the plurality of move-in buffers in the (d).

6. The arithmetic processing unit according to claim 3, wherein
the move-in buffer control unit includes a replace way selection circuit configured to determine whether all the ways have been used as the replace ways by the move-in request having the same index that has been registered in any of the plurality of move-in buffers, and configured to further determine an unused way when all the ways have not been used,
the move-in buffer control unit issues the move-in request of the memory access request having secured the move-in buffer and registers the unused way in the secured move-in buffer when the replace way selection circuit determines that all the ways have not been used in the (c), and
the move-in buffer control unit releases the secured move-in buffer when the replace way selection circuit determines that all the ways have been used in the (d).

7. The arithmetic processing unit according to claim 1, wherein
the move-in buffer control unit secures the move-in buffer for the memory access request, regardless of whether the move-in request having the same index as the index of the memory access request has been registered in any of the plurality of move-in buffers, when judging that the vacant move-in buffer exists in the plurality of move-in buffers.

8. A method for controlling an arithmetic processing unit including:
a memory access request issuance unit configured to issue a memory access request; and
a cache including
a cache memory including a tag memory and a data memory, states of data and data being registered in a block at an index that matches with matching an index of the memory access request inside the tag memory and the data memory,
a move-in buffer control unit that issues a move-in request to register data of the memory access request in the cache when the memory access request causes a cache miss, and
a plurality of move-in buffers each of which registers information of the move-in request,
the method comprising:
the move-in buffer control unit, in response to an input of the memory access request to which the cache miss occurs,
(a) securing a vacant move-in buffer for the memory access request when judging that the vacant move-in buffer exists in the plurality of move-in buffers, (b) issuing a move-in request of the memory access request having secured the move-in buffer when judging that a move-in request having a same index as an index of the memory access request has not been registered in any of the plurality of move-in buffers,
(c) issuing the move-in request of the memory access request having secured the move-in buffer when judging that the move-in request having the same index has been registered in any of the plurality of move-in buffers and further judging that all ways serving as replace ways have not been used by the move-in request having the same index that has been registered in any of the plurality of move-in buffers, and
(d) releasing the secured move-in buffer and prevents an issuance of the move-in request when judging that all the ways have been used.

\* \* \* \* \*